United States Patent
Di Girolamo et al.

(10) Patent No.: US 11,889,411 B2
(45) Date of Patent: Jan. 30, 2024

(54) SERVER IN INTERNET-OF-THINGS COMMUNICATION PATH

(71) Applicant: InterDigital Patent Holdings, Inc., Wilmington, DE (US)

(72) Inventors: Rocco Di Girolamo, Laval (CA); Michael F. Starsinic, Newtown, PA (US); Hongkun Li, Malvern, PA (US); Catalina Mihaela Mladin, Hatboro, PA (US); Zhuo Chen, Claymont, DE (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/145,441

(22) Filed: Dec. 22, 2022

(65) Prior Publication Data

US 2023/0119176 A1 Apr. 20, 2023

Related U.S. Application Data

(63) Continuation of application No. 17/049,766, filed as application No. PCT/US2019/031704 on May 10, 2019, now abandoned.

(Continued)

(51) Int. Cl.
*H04W 48/18* (2009.01)
*H04W 4/70* (2018.01)
(Continued)

(52) U.S. Cl.
CPC .......... *H04W 48/18* (2013.01); *H04B 17/318* (2015.01); *H04W 4/70* (2018.02);
(Continued)

(58) Field of Classification Search
CPC ....... H04W 48/18; H04W 4/70; H04W 48/10; H04W 48/16; H04W 60/06; H04B 17/318
See application file for complete search history.

(56) References Cited

U.S. PATENT DOCUMENTS

| 9,706,447 B2 | 7/2017 | Devarayanigari et al. |
| 2015/0126189 A1 | 5/2015 | Rao et al. |

(Continued)

FOREIGN PATENT DOCUMENTS

| JP | 2008-283576 A | 11/2008 |
| JP | 2015-192334 A | 11/2015 |
| JP | 2016-529811 A | 9/2016 |

OTHER PUBLICATIONS

"Study on NR-based Access to Unlicensed Spectrum", 3GPP TSG RAN Meeting #77, RP-172021, Sep. 11-14, 2017, 5 Pages.

(Continued)

*Primary Examiner* — Diane D Mizrahi
(74) *Attorney, Agent, or Firm* — BakerHostetler

(57) ABSTRACT

Radio networks such as Public Land Mobile Networks (PLMNs), user equipment devices (UEs), servers such as Internet-of-Things servers, and core network entities may be adapted to facilitate transfers of connections of wireless devices. For example, a first PLMN may provide restricted access to a UE to assist the UE in finding a second PLMN for a full connection. Entities may be adapted to support for non-coverage related PLMN transfers, such as transfers initiated by UEs, PLMNs, servers, and core network entities, e.g., in response to changing usage, congestion, etc.

20 Claims, 26 Drawing Sheets

Related U.S. Application Data

(60) Provisional application No. 62/669,669, filed on May 10, 2018.

(51) Int. Cl.
  *H04W 48/10* (2009.01)
  *H04W 48/16* (2009.01)
  *H04W 60/06* (2009.01)
  *H04W 88/06* (2009.01)
  *H04B 17/318* (2015.01)
  *G16Y 20/10* (2020.01)
  *G16Y 10/40* (2020.01)

(52) U.S. Cl.
  CPC ........... *H04W 48/10* (2013.01); *H04W 48/16* (2013.01); *H04W 60/06* (2013.01); *G16Y 10/40* (2020.01); *G16Y 20/10* (2020.01); *H04W 88/06* (2013.01)

(56) References Cited

U.S. PATENT DOCUMENTS

2016/0183159 A1  6/2016  Cui et al.
2020/0322884 A1* 10/2020  Di Girolamo ........ H04W 48/18

OTHER PUBLICATIONS

3GPP TR 23.799 V0.5.0, 3rd Generation Partnership Project; Technical Specification Group Services and System Aspects; Study on Architecture for Next Generation System (Release 14), May 2016, 372 pages.

3GPP TR 23.799 V1.2.1, "Technical Specification Group Services and System Aspects; Study on Architecture for Next Generation System (Release 14)", Dec. 2016.

3GPP TS 21.905 Vocabulary for 3GPP Specifications, V 14.1.1, Jun. 2017, 65 Pages.

3GPP TS 23.501 V0.1.1, "3rd Generation Partnership Project; Technical Specification Group Services and System Aspects; System Architecture for the 5G System; Stage 2 (Release 15)", Jan. 2017, 67 pages.

TS 23.122, Non-Access-Stratum (NAS) functions related to Mobile Station (MS) in idle mode, v15.2.0, Dec. 2017, 54 Pages.

TS 23.501, System Architecture for the 5G System; Stage 2, v15.0.0, Dec. 2017, 181 Pages.

TS 23.502, Procedures for the 5G System; Stage 2, v15.0.0, Dec. 2017, 258 Pages.

"3rd Generation Partnership Project; Technical Specification Group Services and System Aspects; Study on Architecture for Next Generation System (Release 14)", 3GPP TR 23.799 V2.0.0, Nov. 2016, pp. 531.

3rd Generation Partnership Project; Technical Specification Group Services and System Aspects; Service aspects; Service principles (Release 15), 3GPP TS 22.101 V15.4.0, Mar. 2018, pp. 100.

"3rd Generation Partnership Project; Technical Specification Group Services and System Aspects; Study on Provision of Access to Restricted Local Operator Services by Unauthenticated UEs; Stage 1(Release 15)", 3GPP TR 22.820 V15.0.0, Mar. 2017, pp. 12.

Nokia "23.715: Solution: EPC procedures for RLOS", SA WG2 Meeting #125, Jan. 2018, S2-180463, pp. 6.

* cited by examiner

SERVER IN INTERNET-OF-THINGS COMMUNICATION PATH

CROSS-REFERENCE TO RELATED APPLICATIONS

This application is a continuation of U.S. patent application Ser. No. 17/049,766 filed Oct. 22, 2020 which is the National Stage Application of International Patent Application No. PCT/US2019/031704, filed May 10, 2019, which claims the benefit of U.S. Provisional Application No. 62/669,669, filed May 10, 2018, entitled "Server in Internet-of-Things Communication Path", the contents of which are hereby incorporated by reference in their entireties.

BACKGROUND

This disclosure pertains to Public Land Mobile Network (PLMN) selection and switching in machine-to-machine (M2M), Internet-of-Things (IoT), web-of-things (WoT) systems, and the like, such as those described in 3GPP TS 23.501, System Architecture for the 5G System; Stage 2, v15.0.0; TS 23.502, Procedures for the 5G System; Stage 2, v15.0.0; TS 23.122, Non-Access-Stratum (NAS) functions related to Mobile Station (MS) in idle mode, v15.2.0; RP-172021, Study on NR-based Access to Unlicensed Spectrum; and 3GPP TS 21.905 Vocabulary for 3GPP Specifications, V 14.1.1.

SUMMARY

Radio networks, such as Public Land Mobile Networks (PLMNs), may be adapted to facilitate transfers of connections of wireless devices. Further, a radio network may be adapted to support for non-coverage related PLMN transfers.

For example, the first radio network may be adapted to receive a request from a user equipment (UE) or from a second radio network to initiate the transfer of one or more devices from one radio network to another. Further, the first radio network may send a request to a user equipment or to a second network to initiate the transfer of one or more devices from one radio network or another.

A radio network may support devices by providing restricted access for the purposes of assisting in network selection. For example, a device such as a user equipment, may receive system information related to network support for restricted access for network selection assistance from a first network. The device may then send a modified registration request to the first network. The device and the first network use signaling to establish a limited registration, e.g., to allow access to the first network for the limited purpose of finding, and transferring to a second network.

User equipment, and servers such as IoT servers, may also be adapted to facilitate radio network transfers. For example, a user equipment may send a manual network selection request to a server over a first network where the request containing a list of networks found by the UE. The server may then send a manual network response to the user equipment, response from the IoT server containing indication to connect to a second network, e.g., wherein second network is from the list of networks supplied by the user equipment. The UE may then de-register from the first network and register with the second network.

A manual network selection request may, for example, include one or more of: a list of networks (PLMN/RAT combinations) the user equipment has found; received signal strength or other metrics for each network; a cell identity of strongest cell for each network; and an address of an IoT server to contact.

A manual network selection request or response may, for example, be sent via modified Non-Access-Stratum (NAS) control message, embedded in registration request or response message, or sent over an IP connection to an IoT server.

For example, a UE may register with a first network and signal support for non-coverage related PLMN transfers. The UE may then receive a request from an IoT server to perform a network search. The UE may perform the search and send a list of found networks to the IoT server. The UE may receive a PLMN update request to transfer to a second network, wherein the second network may be on the list of found networks. The UE may then de-register from the first network and register with the second network. The PLMN update request may, for example, include: an activation time for when to de-register from the first network and register to the second network; and a time window over which the UE should de-register from the first network and register to the second network.

A core network entity, such as an apparatus implementing a network function, may be adapted to facilitate PLMN transfers. For example, a core network entity may make a determination that one or more UEs, served by an IoT server, should to be transferred to another network. The entity may then send a UE transfer request to the IoT server, requesting assistance in transferring the UEs. The UE may receive a UE transfer response from the IoT server, with a list of UEs to transfer and the target network for these UEs. The entity may then send a PLMNUpdate request to the UEs on the list.

Such operations of the core network entity may be implemented in a number of ways. For example, the determination is based on: a UL load, a DL load, a buffer load, or a signaling load, or some combination thereof. The UE transfer request may include, for instance: a list of UEs, locations of UEs, UE network loads, and a reason for the transfer request.

IoT servers may be adapted to facilitate PLMN transfers in a number of ways. For example, IoT servers may request context information from IoT Application Servers, UEs, and networks. An IoT server may evaluate whether a PLMN transfer is warranted, e.g., based on received context information. The server may determine that a UE on a first network should be transferred to an alternative network. The server may then send a UE transfer proposal to the alternative network, in order to determine whether the alternative network is willing to accept the registration of the UE. If so, the server may send a UE transfer request to the UE through the first network. For example, the evaluation by the IoT server may be based on transferring UEs to the alternate network to minimize the IoT server communication, or to and take advantage of multicast capability of a radio network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE FIGURES

A more detailed understanding may be had from the following description, given by way of example in conjunction with the accompanying drawings.

DETAILED DESCRIPTION

Figure 1:
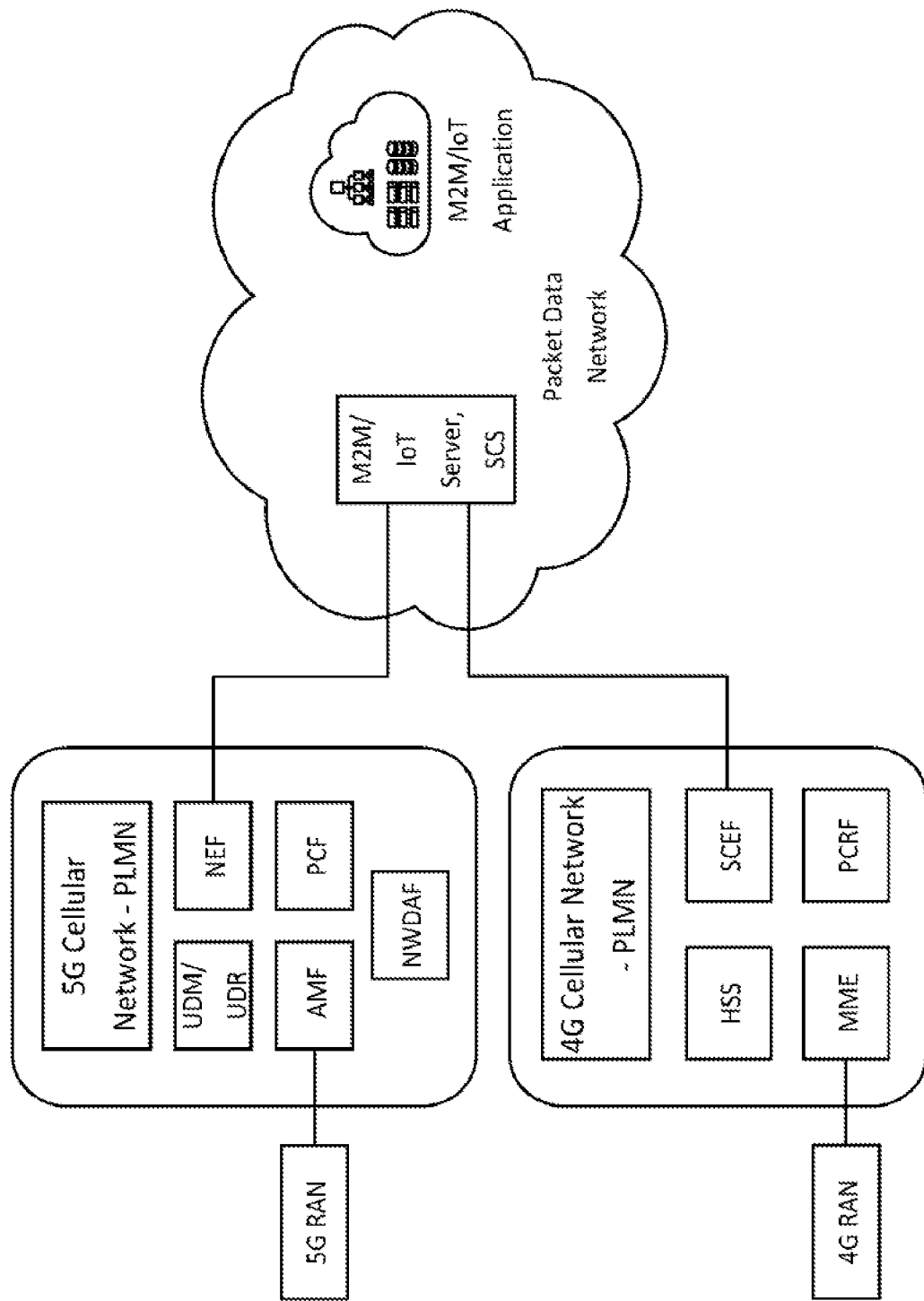
FIG. 1 is a block diagram of an example set of entities in cellular and packet networks.

Herein, the term "device registration" refers to methods by which a device creates a signaling connection with the PLMN's core network. Device registration may be accomplished through an ATTACH REQUEST in 4G networks and through a REGISTRATION REQUEST in 5G networks. Device registration allows a UE to connect to a mobile network and receive services from that network. Device registration is sometimes referred to as "device association" or "device attachment."

Herein, the term "M2M/IoT application" refers to an application that remotely controls/monitors/configures an M2M/IoT device. This is typically done through the aid of services provided by the M2M/IoT Server and through a wireless cellular network, if these devices are cellular. 3GPP typically refers to such applications as Application Servers (ASs).

Herein, the term "M2M/IoT server" refers to an infrastructure node that offers M2M services to M2M/IoT devices. These services reduce the burden on M2M/IoT applications, and include things like: discovery, access control, connectivity. A oneM2M IN-CSE, for example, is an M2M/IoT Server that follows the oneM2M standard. 3GPP refers to such an entity as a Service Capability Server (SCS) or an Application Function (AF)

Herein, the term "PLMN transfer" refers to a transfer which involves a cellular device switching from one PLMN to another. A PLMN transfer may involve switching one or both of the radio access network and/or the core network.

TABLE 1

| | Abbreviations |
|---|---|
| 5GC | 5 G Core |
| 5GS | 5 G System |

TABLE 1-continued

| | Abbreviations |
|---|---|
| AE | Application Entity |
| AF | Application Function |
| AS | Application Server |
| AuC | Authentication Center |
| AMF | Access and Mobility Management Function |
| CN | Core Network |
| CSE | Common Services Entity |
| DN | Data Network |
| DNN | Data Network Name |
| EF | Exposure Function |
| EHPLMN | Equivalent Home PLMN |
| EPC | Evolved Packet Core |
| EPS | Evolved Packet System |
| HPLMN | Home PLMN |
| HSS | Home Subscriber Server |
| IMSI | International Mobile Subscriber Identity |
| IN-AE | Infrastructure Node AE |
| IN-CSE | Infrastructure Node CSE |
| IP | Internet Protocol |
| IoT | Internet of Things |
| LAA | License Assisted Access |
| LTE | Long Term Evolution |
| M2M | Machine to Machine |
| MME | Mobility Management Entity |
| MNC | Mobile Network Code |
| MVNO | Mobile Virtual Network Operator |
| NAS | Non-Access Stratum |
| NEF | Network Exposure Function |
| NR | New Radio |
| NSSP | Network Slice Selection Policy |
| NWDAF | Network Data Analytics Function |
| PCF | Policy Control Function |
| PCRF | Policy and Charging Rules Function |
| PDU | Packet Data Unit |
| PLMN | Public Land Mobile Network |
| RAN | Radio Access Network |
| RPLMN | Registered PLMN |
| RLOS | Restricted Local Operator Services |
| RSS | Relative Signal Strength |
| SCEF | Service Capability Exposure Function |
| SCS | Service Capability Server |
| SEPP | Security Edge Protection Proxy |
| SSC | Session and Service Continuity |
| SSCMSP | SSC Mode Selection Policy |
| UDM | Unified Data Management (UDM): |
| UDR | Unified Data Repository |
| UE | User Equipment |
| URSP | UE Route Selection Policy |
| USIM | Universal Subscriber Identity Module |
| VPLMN | Visited PLMN |

Cellular Network Entities (Network Functions)

FIG. 1 shows a number of cellular network entities and cellular network functions, that are relevant to the systems, methods, and apparatuses described herein. See 3GPP TS 21.905 Vocabulary for 3GPP Specifications, V 14.1.1.

Referring to FIG. 1, a Mobility Management Entity (MME) is an entity within the cellular network that manages registration, mobility, and UE reachability in IDLE mode. The MME is also involved with authentication and authorization.

An Access and Mobility Management Function (AMF) is a network function within a 5G cellular network that handles registration, connection, mobility, and reachability management. The AMF is also involved with security: access authentication, access authorization, and deriving the access network specific keys. As such, the AMF is similar in functionality to an MME.

A Home Subscriber Server (HSS) is an entity within the cellular network that stores subscription information for the connecting devices. The subscription information includes the subscriber identity (in the form of an IMSI) and security keys used for authentication, encryption, and data integrity. The HSS may also include other parameters associated with the subscription including the services that can be accessed, the quality of service they will get, the access technologies they can use, the charging model, etc. In the examples herein, it is generally assumed that the HSS includes functionality of the Authentication Center (AuC). However, such AuC functionality may be located in a separate entity.

A Unified Data Management (UDM) is a network function within a 5G cellular network that stores subscription information for the connecting device. A UDM is similar in functionality to an HSS. In some cases the operator subscription information may be stored in a Unified Data Repository (UDR), in which case the UDM would be a form of front end that retrieved the subscription data from the UDR.

A Service Capability Exposure Function (SCEF) is an entity within the cellular network that exposes the services and capabilities provided by 3GPP network interfaces. The SCEF allows for $3^{rd}$ party applications to determine UE reachability, set up monitoring of network events, permit group message delivery, etc.

A Network Exposure Function (NEF) is a network function that exposes services and capabilities provided by a 3GPP network. The NEF also provides a means for $3^{rd}$ parry applications to provide information to the cellular network, such as mobility or communication patterns for example. As such an NEF is similar in functionality to an SCEF.

A Policy and Charging Rules Function (PCRF) is an entity within the cellular network that aggregates information to and from the network, operational support systems, and other sources (such as external $3^{rd}$ party servers) in real time, supports the creation of rules, and may make policy decisions based on this input. Rules are provided to the subscribers as well as other entities within the 3GPP network which manage the traffic from these subscribers.

A Policy Control Function (PCF) is a network function that receives input from subscription information and $3^{rd}$ party servers, supports unified policy framework to govern network behavior, and provides policy rules to Control Plane functions to enforce them.

A Network Data Analytic Function (NWDAF) is a network function that enables other network functions to request and get different type of network analytic information, such as the load level information of Network Slice instance, for example.

The 5G-RAN is a New Radio (NR) radio access network that connects to, e.g., a 5G core network.

The 4G-RAN is the RAN used for LTE (Long Term Evolution).

IoT Cellular Deployments

Figure 2:
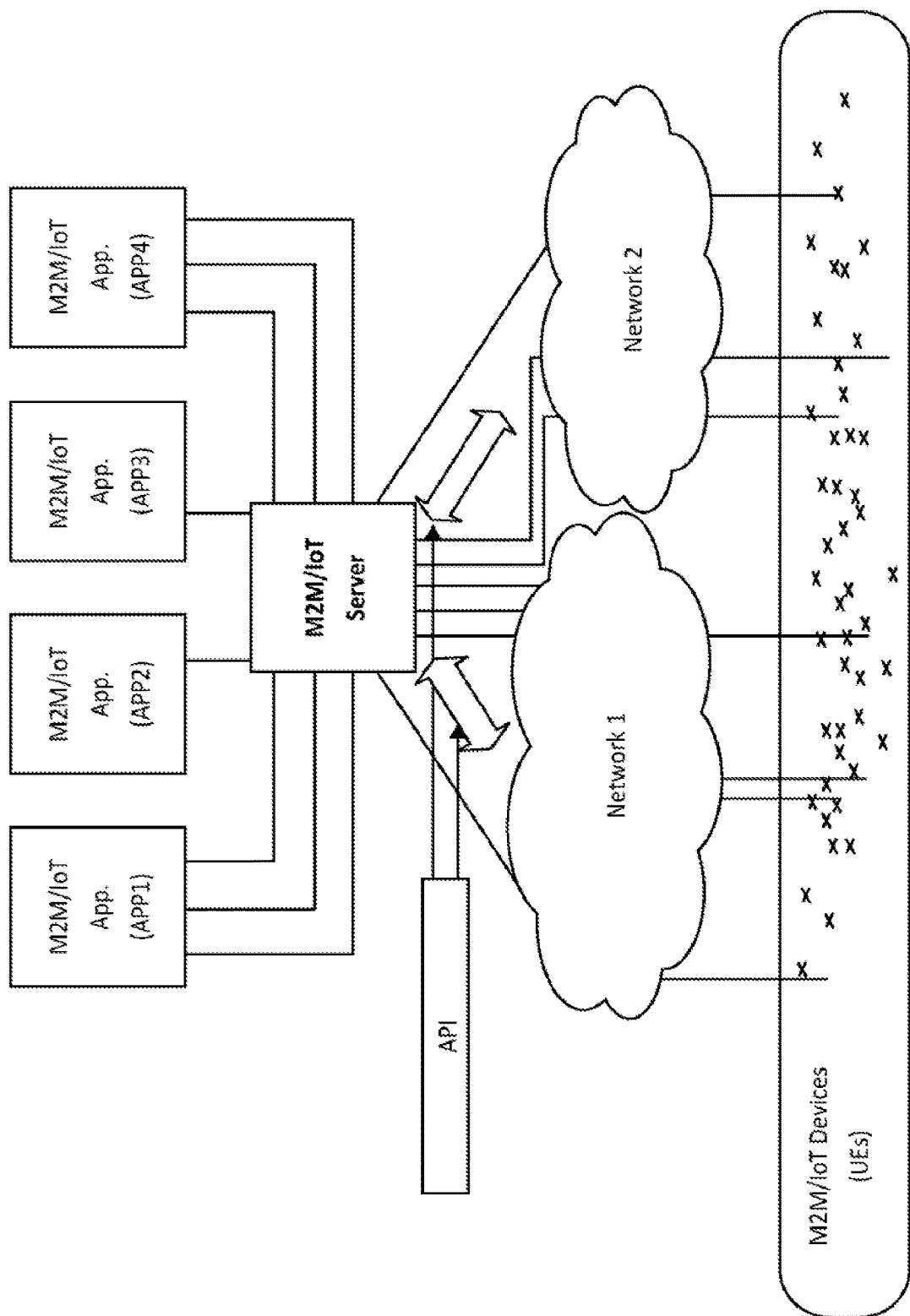
FIG. 2 is a block diagram of an example IoT cellular deployment.

FIG. 2 depicts a typical IoT cellular deployment. The M2M/IoT Applications are applications that remotely control/monitor/configure an M2M/IoT device. This is typically done through the aid of services provided by the M2M/IoT Server and through a wireless cellular network, if these devices are cellular. 3GPP typically refers to such applications as Application Servers (ASs). oneM2M typically refers to such devices as Infrastructure Application Entities (IN-AEs).

The M2M/IoT Server is a server that provides value added M2M/IoT services to M2M/IoT applications and M2M/IoT devices. The main purpose of the M2M/IoT server is to reduce the burden on the M2M/IoT applications and the M2M/IoT devices. The M2M/IoT server provides a host of functions such as data storage, data advertising, access control, etc. For the most part, it acts as a middleman between the M2M/IoT applications and the M2M/IoT devices. As a result, applications don't communicate directly with the devices. Instead, the devices store their data in the M2M/IoT server, from which they can be later retrieved by the M2M/IoT application. 3GPP typically refers to the M2M/IoT Server as a Service Capability Server. oneM2M typically refers to the M2M/IoT server as Infrastructure Capability Service Entity (IN-CSE).

It will be appreciated from FIG. 2 that an M2M/IoT Server may serve many different M2M/IoT applications (e.g., APP1, APP2, APP3, and APP4). The M2M/IoT devices may be associated/attached/registered to different networks, and as a result the M2M/IoT Server serving these devices will have an interface to each of these networks (e.g. Network 1 and Network 2). An M2M/IoT application may communicate to M2M/IoT devices that are associated, attached, or registered to different networks. An M2M/IoT device may communicate with many different M2M/IoT applications. M2M/IoT Server is a funnel point between the M2M/IoT applications and the Networks and M2M/IoT devices.

PLMN Selection

In 3GPP, cellular capable devices are also known as UEs, and the network operators are also known as Public Land Mobile Networks (PLMNs). PLMNs are typically contained within national boundaries. Typically, an operator will have a single PLMN per country, but in some cases, operators may have multiple PLMNs within a national boundary.

UEs need to regularly perform a procedure known as PLMN selection to find and register to the network that will provide the UE its cellular service. PLMN Selection is defined in TS 23.122, Non-Access-Stratum (NAS) functions related to Mobile Station (MS) in idle mode, v15.2.0. The procedure is based on a set of rules defined in the UE. A UE normally operates on its home PLMN (HPLMN) or equivalent home PLMN (EHPLMN). However, a visited PLMN (VPLMN) may be selected, for instance if a UE loses coverage or is roaming in a foreign country. There are two modes for PLMN selection in TS 23.122: automatic mode and manual mode.

Automatic mode utilizes a list of PLMN/access technology combinations in priority order. The highest priority PLMN/access technology combination which is available and allowable is selected.

In manual mode, the UE indicates to the user which PLMNs are available. Only when the user makes a manual selection does the UE try to obtain normal service on the PLMN.

A UE may maintain a number of lists in its USIM. In an EHPLMN list, a UE may store a set of PLMNs that are equivalent to the HPLMN. The EHPLMN list may be used by operators that have more than one assigned Mobile Network Code (MNC), for example. In a User Controlled PLMN Selector with Access Technology list, a UE may store a list of PLMNs that have been provided by the user. In an Operator Controlled PLMN Selector with Access Technology list, a UE may store a list of PLMNs that have been provided by the network A UE may store a Forbidden PLMN List, e.g., a list of PLMNs which are forbidden by the network. The UE, for example, adds to such a list after a registration attempt where the network responds with a "PLMN not allowed"

message. A UE in Automatic Mode should not attempt registration to a PLMN on this list. A PLMN is removed from the list if a registration while in Manual Mode is successful, or if a timer associated with the PLMN entry expires.

Once a UE has registered on a PLMN, this PLMN is referred to as the Registered PLMN (RPLMN). In order to avoid a UE from ping-ponging from one PLMN to another and to speed up the initial start-up time, a UE will always try to re-register on the last or prior RPLMN.

At switch on, or recovery from lack of coverage, if the RPLMN is no longer available and the UE is in Automatic Mode, the UE will autonomously choose the highest priority PLMN that it found during its PLMN search. In contrast, if the RPLMN is no longer available and the UE is in Manual Mode, it will display a ranked list of the PLMNs that it found during its PLMN search. The user is then expected to select from one of the found PLMNs.

The operation is slightly different while roaming in a visited PLMN. In such a case the UE periodically attempts to obtain service on its HPLMN (or an Equivalent HPLMN or a higher priority PLMN/access technology combinations listed in "user controlled PLMN selector" or "operator controlled PLMN selector").

Steering or Roaming

A UE may be steered to a specific PLMN using "Steering of Roaming". If the UE receives a command of type "Steering of Roaming", it is expected to take certain actions. First, the UE should replace the highest priority entries in the "Operator Controlled PLMN Selector with Access Technology" list stored in the UE with the list provided in the received command. Second, the UE should delete the PLMNs identified by the list in the received command from the Forbidden PLMN list, if they are present in these lists. Third, the UE should take the new information into account in subsequent attempts to access a higher priority PLMN. Last, the UE should immediately attempt to obtain service on a higher priority PLMN.

Inter-PLMN Communication (for Roaming)

Figure 3:
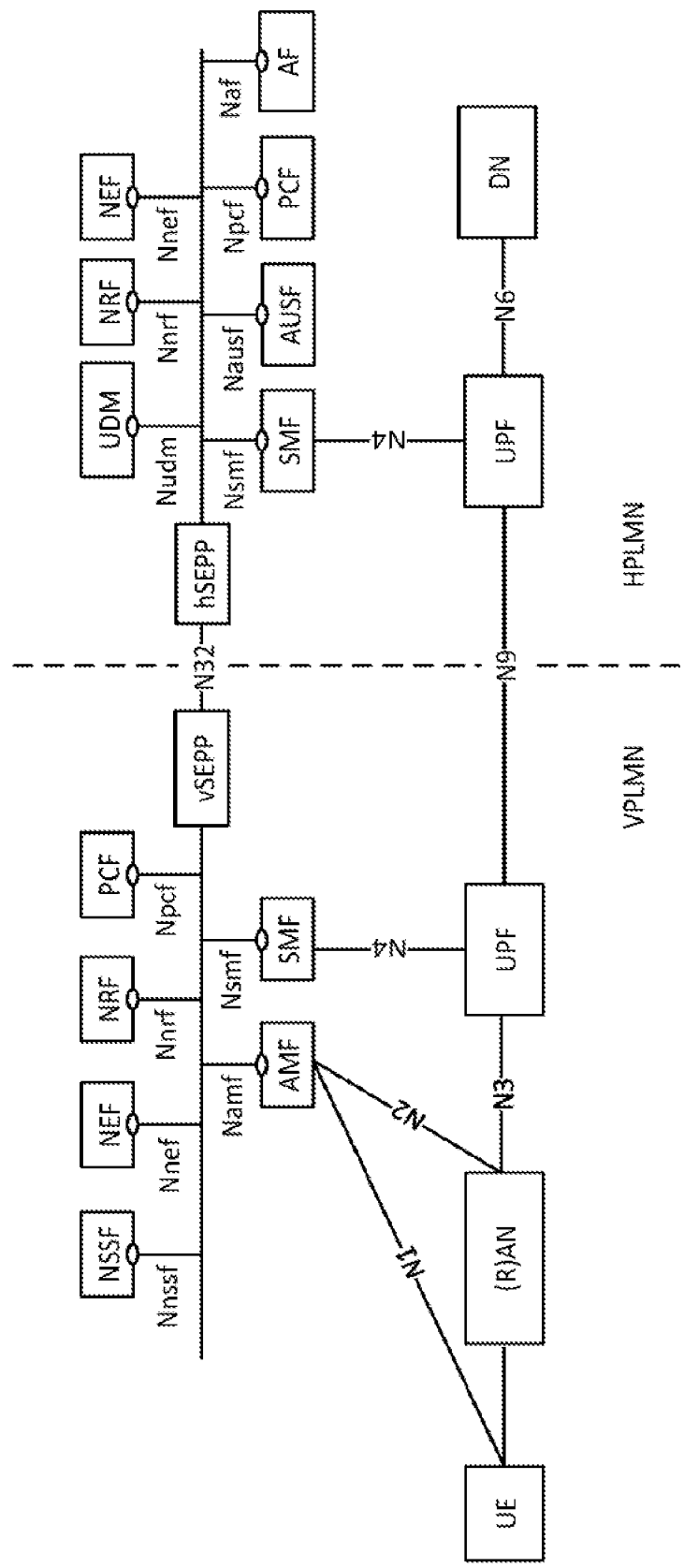
FIG. 3 is a block diagram of an example set of entities involved in home routed roaming.
Figure 4:
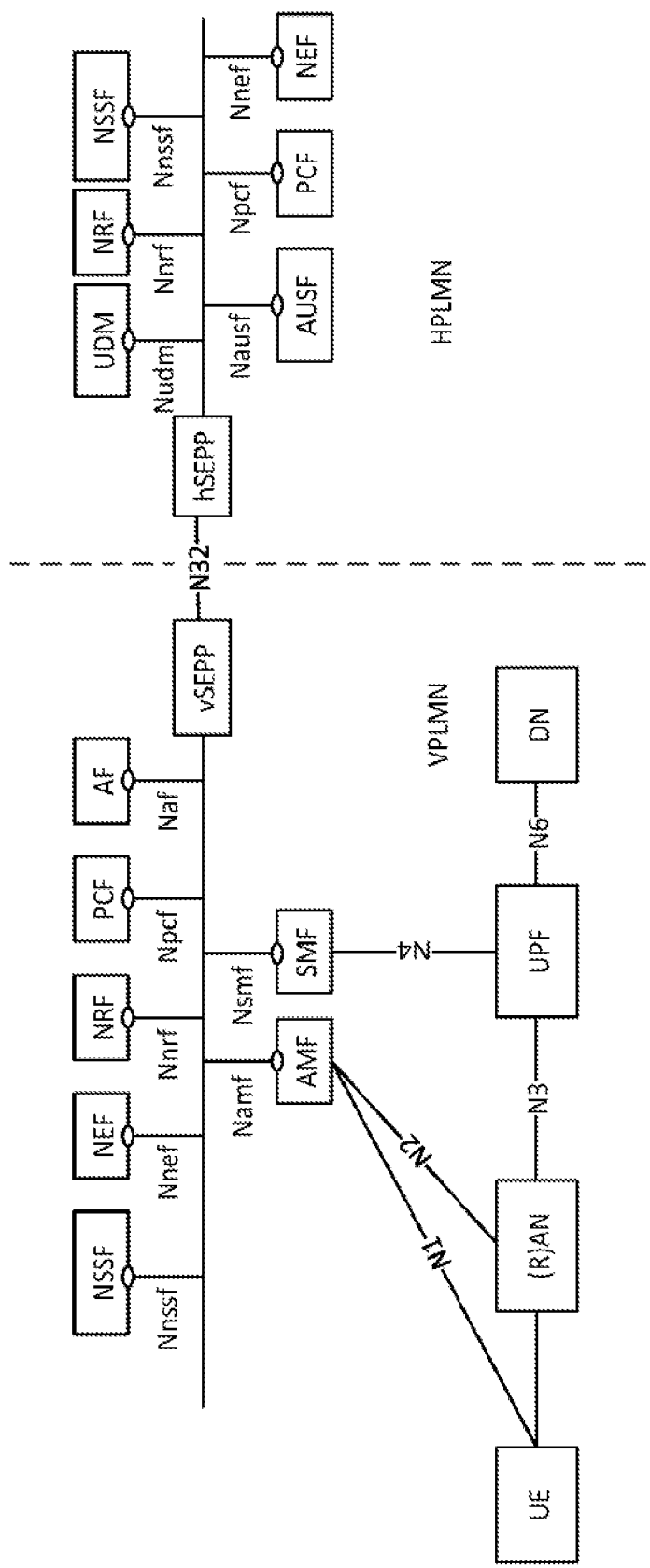
FIG. 4 is a block diagram of an example set of entities involved in local breakout roaming.

5G networks allow two modes of roaming::Home Routed, as illustrated in FIG. 3; and Local Breakout, as illustrated in FIG. 4. Control plane communication between the home and visited PLMNs is through the Security Edge Protection Proxy (SEPP) and over the N32 interface. The SEPP is a non-transparent proxy that mainly supports message filtering and policing on inter-PLMN control plane interfaces. User plane communication is through the N9 interface, which carries multiple PDU sessions from the VPLMN to the HPLMN over a UDP/IP connection.

Shared and Unlicensed Spectrum

Use of unlicensed spectrum and shared spectrum is already available for LTE devices, and a new study item was started in 5G to study 5G NR operating in unlicensed spectrum, both licensed-assisted and standalone.

In the study item RP-172021, Study on NR-based Access to Unlicensed Spectrum, the objectives include: "Coexistence methods within NR-based and between NR-based operation in unlicensed and LTE-based LAA and with other incumbent RATs in accordance with regulatory requirements in e.g., 5 GHz, 37 GHz, 60 GHz bands." In particular, the study item is to use the coexistence methods already defined for 5 GHz band in LTE-based LAA context as the baseline for 5 GHz operation. However, enhancements in 5 GHz over these methods are in scope. As a high-level objective, NR-based operation in unlicensed spectrum should not impact deployed Wi-Fi services (such as data, video, and voice services) more than an additional Wi-Fi network on the same carrier.

NSSP and URSP

UE Route Selection Policies (URSPs) are polices that are provided by the PCF in the 5GC to the UE. These policies are used by the UE to determine how to route outgoing traffic. Traffic can be routed to an established PDU Session, can be offloaded to non-3GPP access outside a PDU Session, or can trigger the establishment of a new PDU Session.

A URSP may include: an SSCMSP (SSC Mode Selection Policy) that is used to map traffic to an SSC mode; an NSSP (Network Slice Selection Policy) that is used to map traffic to an S-NSSAI; a DNN Selection Policy that is used to map traffic to a DN; and access network preferences which are used to map traffic to an access network type. A UE may also have local preferences that can be used to determine how to treat traffic. Local preferences take precedence over URSPs.

Congestion Use Case Example

Figure 5:
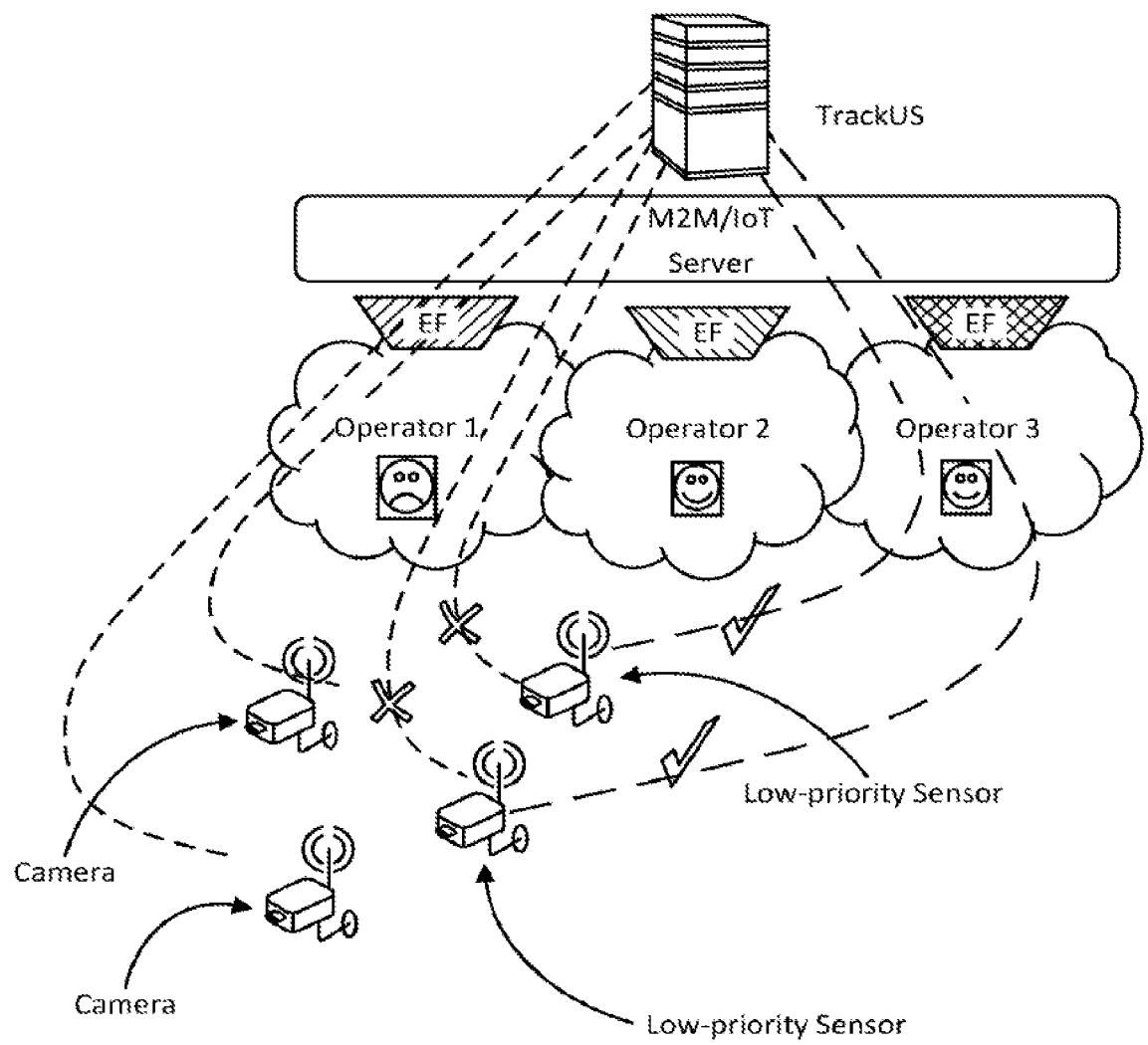
FIG. 5 is a block diagram of an example congestion use case.

FIG. 5 is a block diagram of an example congestion use case. In FIG. 5, an M2M/IoT server interfaces to three operator networks (Operator 1, Operator 2, and Operator 3) through their respective Exposure Function (EF). A fleet management company (TrackUS) has a number of sensors installed in all of its trucks. The vast majority of these devices generate very little data and are of low priority, however a few are video cameras, which are turned on regularly for safety or monitoring reasons. TrackUS needed complete national coverage and so it negotiated preferred rates with two national operators (namely Operator 1 and Operator 3). Both rates are very good, but the rate from Operator 1 is slightly better. As a result, TrackUS would prefer that its devices/sensors connect to Operator 1.

Due to a traffic jam, Operator 1 experiences some heavy congestion on its signaling channel in a particular cell. In a 4G network, the EPC may solve this problem in a "brute force" manner and bar select devices from accessing the network. However, rather than blocking the low-priority sensor devices, Operator 1 decides to transfer some of these devices to another operator. Operator 1 asks the M2M/IoT server to assist in the transfer, as the M2M/IoT server has valuable UE context information (for instance the preferred operators), and is in a better position to determine which of the sensors to transfer to the other operators.

M2M/IoT server finds that operator 2 and 3 provide the necessary services. Operator 3 is a preferred operator, and is willing to accept the devices. M2M/IoT server informs the low priority sensor devices to connect to this operator. The sensors disconnect from Operator 1, and reconnect to Operator 3 to obtain service.

Example Problems Raised by Conventional Solutions

Existing standards provide for transferring UEs between PLMNs is allowed under two conditions. The first is during international roaming, e.g., where the HPLMN provides no service. In such a case, the UE is registered to a VPLMN and the HPLMN does not provide service in the country where the UE is roaming. In IDLE mode, the UE will periodically try to register to a higher priority PLMN;

The second is during national roaming, where there are coverage holes in an operator's coverage. The HPLMN and VPLMN are in the same national boundary, but the UE may be in a location where the reception from the HPLMN is very poor or non-existent. For example, this is known as extended coverage or extended national roaming in Canada. UEs from Operator1 can be pushed to a competitor's network (Operator2), if Operator1 provides no coverage to those UEs. There are no additional roaming charges to the subscribers, and the subscriber is entitled to almost the same set of services in the competitor's network For the most part, PLMNs manage their own network, and they share UEs amongst each other only for coverage reasons (either due to poor signal quality in a national roaming case or lack of presence in an international roaming case). There is no conventional mechanism to share UEs amongst PLMNs for non-coverage reasons, e.g., to resolve congestion or for some other optimization. As a result, the PLMN may be required to stop providing services to some UEs, e.g., by disconnecting these or refusing registration requests. In addition, even if this transfer between PLMNs were allowed, the PLMN may not be in the best position to select which UEs to transfer. The unique position of the SCS in the IoT communication path is not fully leveraged.

The SCS has, or is able to obtain knowledge of network context and visibility that spans multiple PLMNs (information that one PLMN would not necessarily know about a neighbor PLMN), including: slice information (number of slices, types of slices); load on network or network slice (user plane and control plane); coverage area (or coverage holes) of network; number of UEs; number of active (CONNECTED, IDLE, or SUSPENDed) UEs in a network or network slice; and average UE latency (for mobile originated or mobile terminated traffic)

The SCS has, or is able to obtain: a great deal of UE context information, such as: anything from the UE subscription; the number of flows per UE; location of the UE; mobility pattern of the UE; reachability of the UE; historical flow to/from UE; power saving state of the UE; and transmission characteristics to/from a UE (communication patterns).

For purposes of illustration, solutions are presented herein as a means to share UEs amongst PLMNs for non-coverage reasons, e.g., to resolve congestion or for some other optimization. However, the same solutions may also be used for sharing UEs amongst PLMNs for coverage reasons. For example, a UE may be transferred to a Mobile Virtual Network Operator (MVNO) using any of the techniques described herein.

PLMN Transfer

The call flows of FIGS. 6-14 show example methods of achieving PLMN transfer. For simplicity, in FIGS. 6-14, it is assumed that the UE is initially connected to its Home PLMN and that it is then transferred to a VPLMN. It should be understood that the solutions may also apply to the case that a UE is connected to a visited PLMN and that it is transferred to another VPLMN or the HPLMN. For example, a UE is connected to VPLMN1 and VPLMN1 becomes congested. In this case, VPLMN1 may ask the server to transfer some UEs. The server could then determine that it may transfer the UEs to another VPLMN (VPLMN2) or bring them back to the HPLMN.

In each of the methods of FIGS. 6-14, whenever new PLMN selection policies are provided to the UE, new NSSP of the URSP rules may also be provided.

PLMN Reselection Triggered by M2M/IoT Device

Manual Network Selection may be achieved by the device owner through the M2M/IoT server. The M2M/IoT device provides a list of PLMN/RAT combinations to the M2M/IoT server, which then selects the combination to try.

It is assumed that some PLMNs will permit M2M/IoT devices to connect with very limited and restricted access, for example via a Restricted Local Operator Services (RLOS) connection. This access allows these devices to contact their M2M/IoT server and have the server assist in PLMN selection. These PLMNs may broadcast an indication that they support "Restricted Access for Network Selection Assistance" or they may broadcast that they support RLOS and the UE may use the RLOS connection to determine that the network supports "Restricted Access for Network Selection Assistance" and then use the RLOS connection to begin "Restricted Access for Network Selection Assistance". The details are shown in FIGS. 6 and 7 and are described below.

Figure 6:
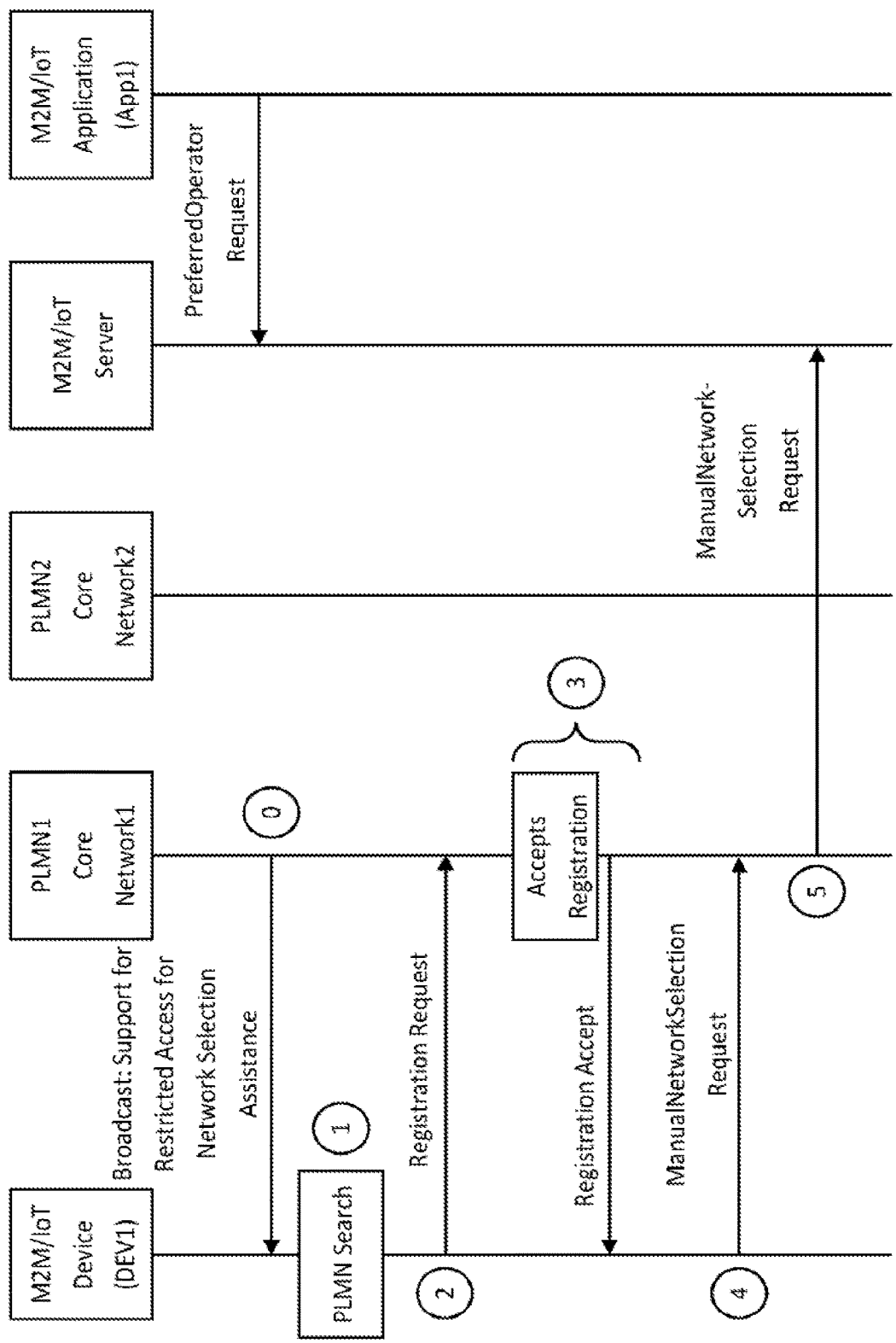
FIGS. 6 and 7 show a call flow of an example method for PLMN selection triggered by an M2M/IoT Device.
Figure 7:
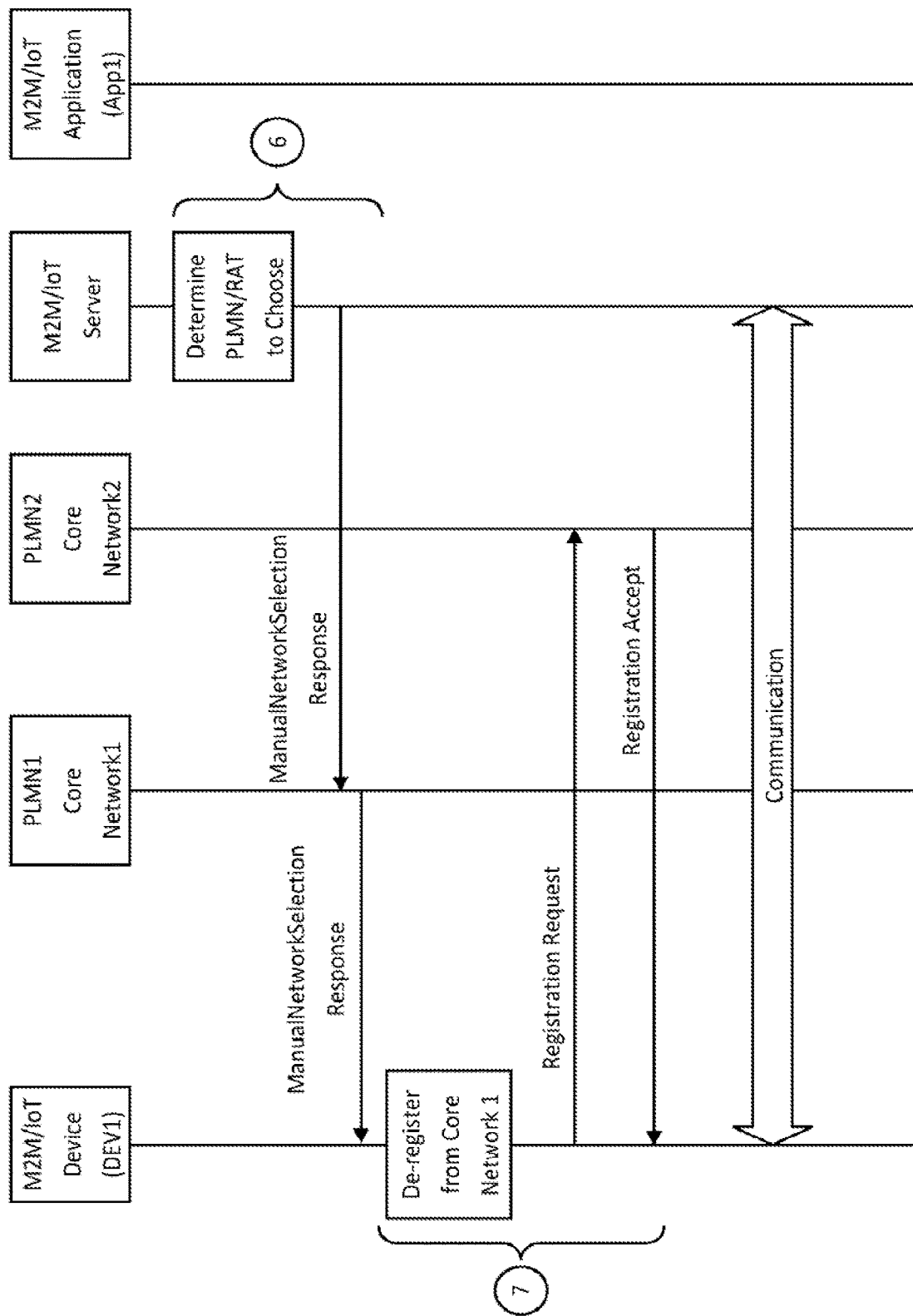

In the examples of FIGS. 6 and 7, it is assumed that the M2M/IoT device Dev1 is deployed, and that the M2M/IoT application has informed the M2M/IoT server that the specific M2M/IoT device (Dev1) has a preferred PLMN/RAT list. For example, the list may include the following combinations from 3 PLMNs and 2 RAT types: PLMN1/RAT1; PLMN1/RAT2; PLMN2/RAT1; PLMN3/RAT1; and PLMN2/RAT1.

In step 0, the PLMN of core network 1 broadcasts that it supports "Restricted Access for Network Selection Assistance" as part of its system information.

In step 1, DEV1 performs a PLMN search (either as a result of power on, loss of connectivity, or a periodic search) and determines a candidate PLMN/RAT list. For each entry in this list, DEV1 also determines the strength of the strongest cell (for example the relative signal strength (RSS)). DEV1 does not see the prior Registered PLMN in this list. It has no policy on which PLMN to select, or if such a policy exists, it is disabled. For example, a 3GPP UE may be set to Manual Network Selection mode.

As part of the search, DEV1 may determine if a PLMN allows "Restricted Access for Network Selection Assistance."

In step 2, DEV1 registers with a core network. DEV1 may choose from the found PLMN/RAT combinations that supports "Restricted Access for Network Selection Assistance". For example, DEV1 may select randomly from one of the found PLMN/RAT combinations, it may choose the combination with the strongest signal, it may choose a PLMN/RAT combination that it used previously, or it may choose the first found PLMN/RAT combination. For purposes of the example of FIGS. 6 and 7, it is assumed that the M2M/IoT device selects Core Network 1. The Registration Request may include Registration Type=Restricted Access for Network Selection Assistance, for example, as an indication to the core network that the registration request is for limited access to allow device to contact the M2M/IoT server.

In step 3, Core Network 1 accepts the registration.

In step 4, DEV1 issues a new NAS control message ManualNetworkSelection Request to core Network 1. For example, this message may be directed to the AMF of core network 1. The request may include a PLMN/RAT list, such as a list of discovered cells. Each entry in the list may include the received signal strength of the strongest cell and the identity of the strongest cell (for example a cell ID). Alternatively, the list may be ordered from strongest to weakest PLMN/RAT combination. The request may also include an address of the device's M2M/IoT server.

In step 5, the AMF of Core Network 1 forwards the request to the NEF, which in turn, forwards the request to the M2M/IoT server. The core network may include other UE context information in the request, such as the location of DEV1 (for example, the cell identity or the tracking area identity) or the network slice being used.

The call flow of FIG. 6 continues in FIG. 7. In step 6 of FIG. 7, the M2M/IoT server selects the PLMN/RAT combination using the stored preferred PLMN/RAT list and other received UE context information received in the request. The server may have a local policy to assist in selecting the PLMN/RAT combination. The server may display the received information on a graphical user interface to allow a user to select the PLMN/RAT combination. The server may send a notification to a configured third party application server to have it select the PLMN/RAT combination.

Once the PLMN/RAT selection is made, the M2M/IoT server sends a ManualNetworkSelection Response back to the NEF of core network 1, which sends it to the AMF and further to the M2M/IoT device.

In step 7, the M2M/IoT device de-registers with Core Network 1, and registers with Core Network 2.

As an alternative to step 4 of FIG. 6, the UE may establish a PDU session in the core network, and use IP to send the ManualNetworkSelection Request to the M2M/IoT server. For example, an RLOS connection may be used to reach the IoT Server.

As another alternative to step 4 of FIG. 6, the message may be forwarded from the AMF to the PCF. The PCF may generate a new preferred PLMN/RAT list and send it to the UE. The PCF may involve the IoT Server in this process by querying the IoT Server (via the NEF) to obtain its PLMN preferences.

As another alternative, the information in Step 4 of FIG. 6 may be sent with the initial registration request (Step 2). For example, the ManualNetworkSelection Request, may be embedded inside the Registration Request. Subsequently, Core Network 1 may extract the ManualNetworkSelection Request and forward it to the M2M/IoT Server for assistance. The ManualPLMNSelection Response may then be included inside a Registration Reject message from Core Network 1. The UE may then extract the PLMN information from then ManualPLMNSelection response, and attempt a subsequent registration to this PLMN.

PLMN Reselection Triggered by Core Network

When the core network detects conditions that can be resolved by transferring some UEs to another PLMN, the core network may ask the M2M/IoT server for assistance.

Figure 9:
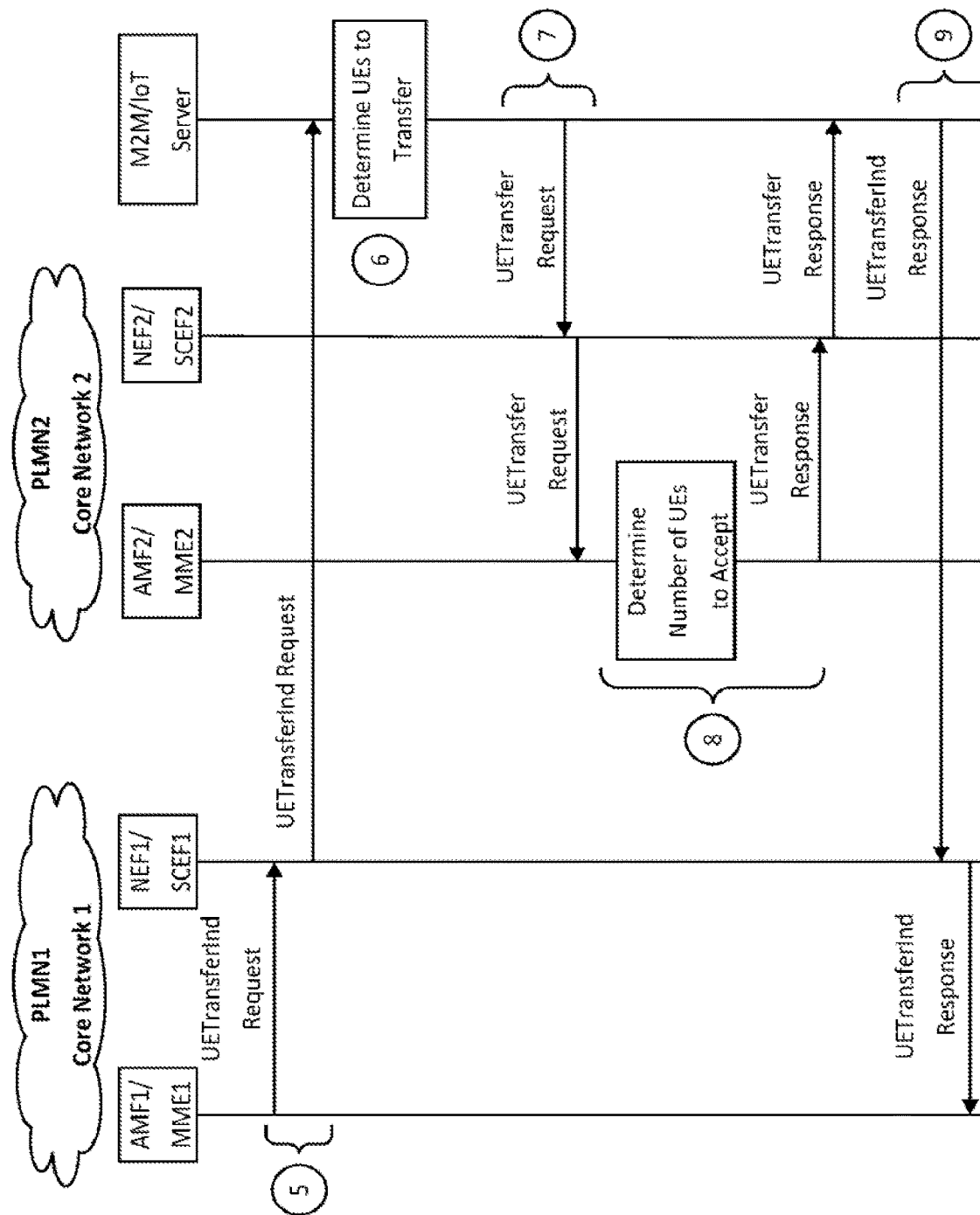
Figure 10:
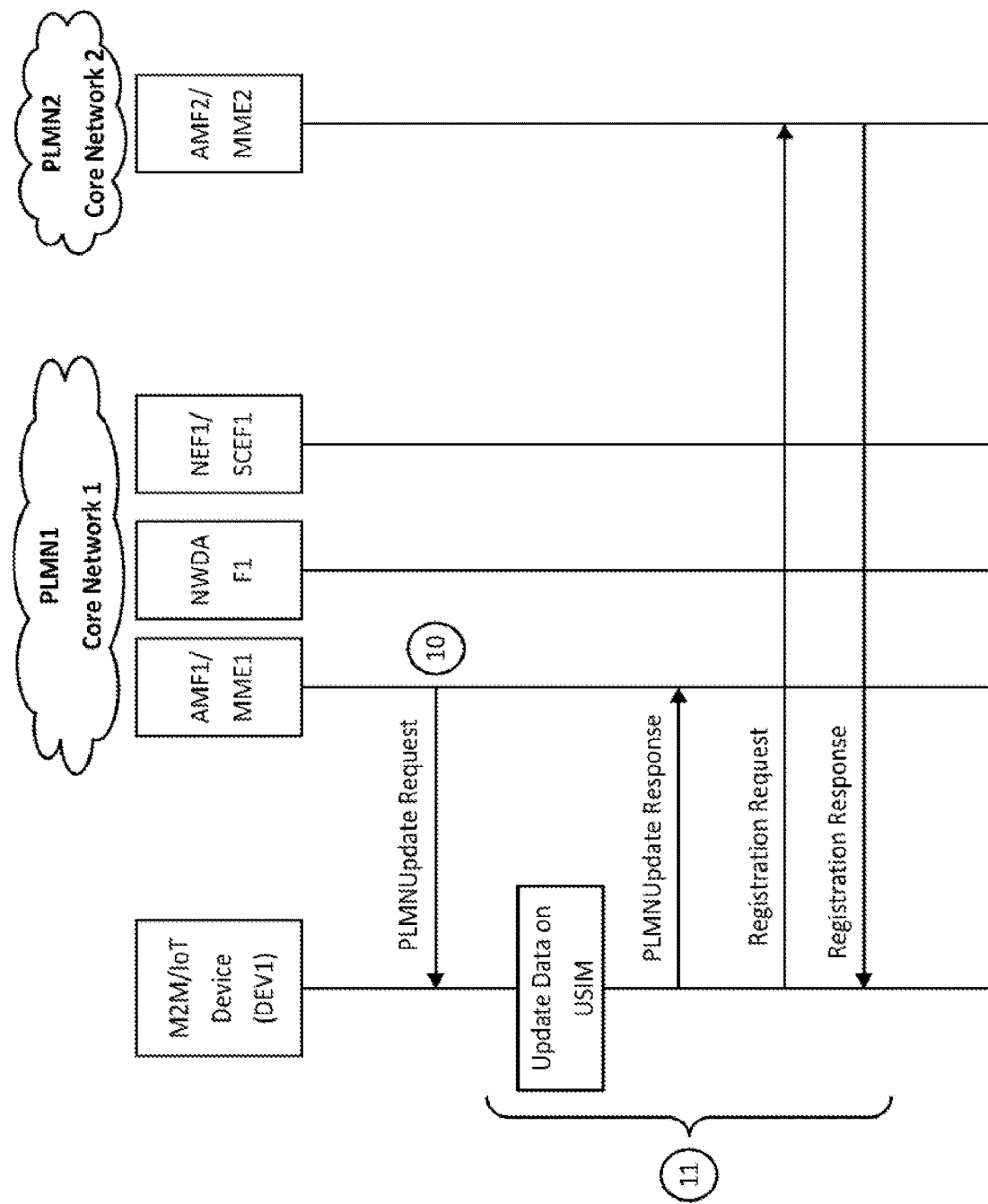

It is assumed that the M2M/IoT server has a preference of PLMNs, and would like to control aspects of transferring devices to another PLMN. The details are shown in FIGS. 8-10, and described below.

Figure 8:
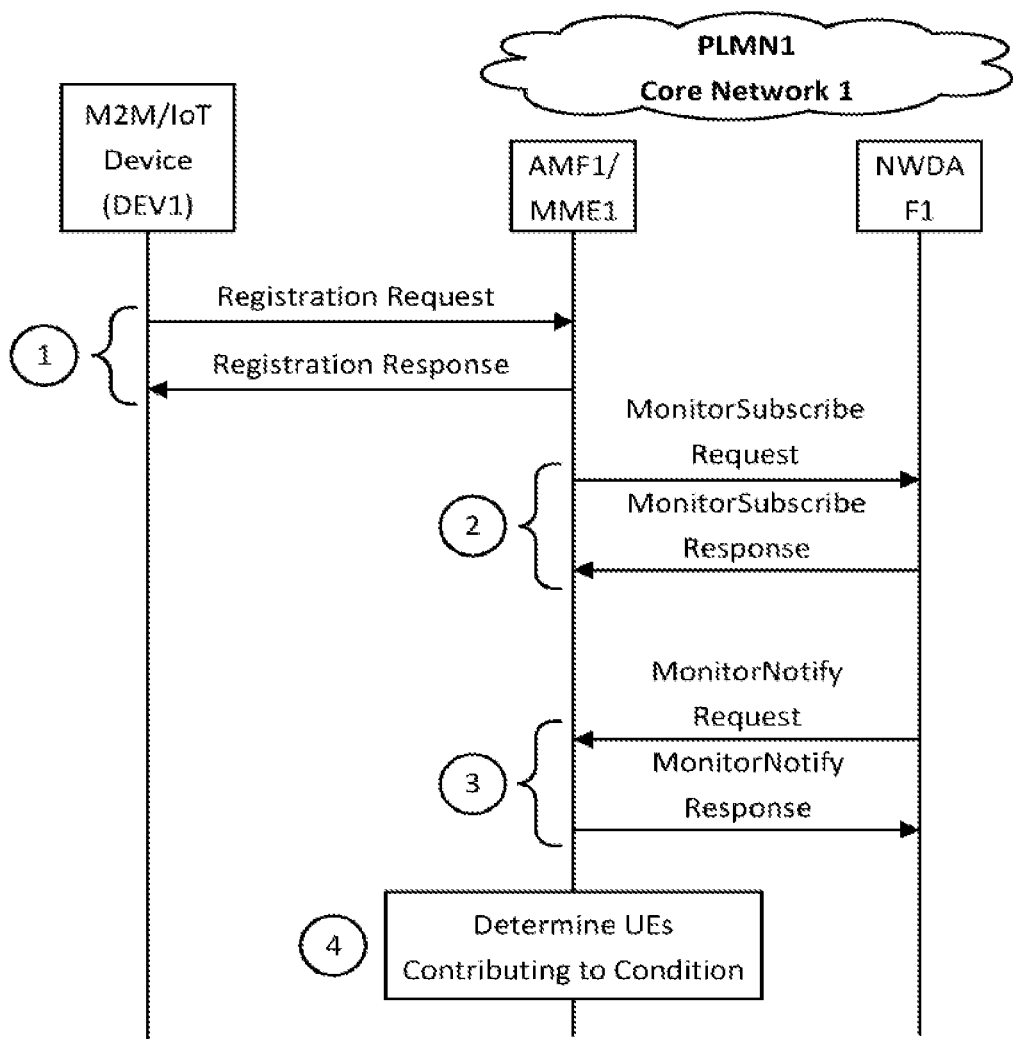
FIGS. 8-10 show a call flow of an example method for PLMN reselection triggered by a core network.

In step 1 of FIG. 8, an M2M/IoT device (DEV1) registers with core network 1. As part of the registration, the UE includes its capability, where DEV1 indicates that it is capable of core network directed PLMN reselection. Alternatively, this information may be part of the devices subscription information. The Registration Accept message may indicate to the UE if the network supports this capability, or the indication may have been broadcast by the network.

In step 2, Core Network 1 determines to start monitoring for problem conditions. AMF1 issues a MonitorSubscribe Request to the NWDAF1 associated with core network 1. The NWDAF provides advanced analytical data about core network 1. For example, AMF1 may subscribe to monitor: user plane UL and/or DL loads in RAN; user plane UL and/or DL loads in core network; control plane UL and/or DL loads in RAN; control plane UL and/or DL loads in core network; or buffering load in the core network, e.g., for UEs that are not reachable.

In addition, the granularity of the subscribe request may be targeting a specific cell, tracking area, network slice, UE, or group of UEs. The request may be for a periodic update or based on the monitored criteria crossing thresholds For the call flow, it is assumed that AMF1 has requested to be notified when the buffering, device count, control plane connection, or user plane connection load in the core network exceeds a threshold (for instance 70% of maximum capacity).

In step 3, at some point the buffering load exceeds the threshold. The NWDAF1 sends a MonitorNotify Request to the AMF. This may include a list of UEs that are contributing to the buffer overflow.

In step 4, AMF1 determines that the majority of the offending UEs are using the services of the M2M/IoT Server. AMF1 may decide to initiate the procedure to offload a number of UEs to another PLMN. Alternatively, the AMF and/or the NWDAF may provide the necessary information to the PCF (offending UEs, M2M/IoT servers servicing these UEs, load on the network, location of the offending UEs etc.) and the PCF may use some local policy to determine if the network should initiate offload of some UEs to another PLMN.

The call flow of FIG. 8 continues in FIG. 9. In step 5 of FIG. 9, AMF1 sends a UETransferInd Request to the M2M/IoT Server. The request may contain UE context information, including a list of UEs for potential transfer, or a request to transfer a percentage of UEs. This request is sent via NEF1 to the M2M/IoT Server. This request may include an indication of the location of the UEs, the observed traffic loads (user plane and control plane), the reachability cycle of the UE, the network slice type of the UE, etc. This request may also include an indication of the reason for the transfer (for example, S-GW DL buffer load, UL signaling load, etc.). This request may be sent to the PCF rather than the M2M/IoT Server. The PCF may then decide what devices should be offloaded.

In step 6, the M2M/IoT server (or PCF1), determines the UEs that it should transfer. The call flow assumes that DEV1 is one of these UEs. The M2M/IoT server determines the offload PLMN for DEV1. For example, it may know that core network 2 is a preferred PLMN for this UE, or it may make its decision based on the UE context information in the request. For example, the M2M/IoT server may have coverage maps of all the PLMNs, and may determine which PLMNs provide service at the UEs current location and are suitable candidates for offload PLMN. If necessary, the PCF1 may obtain this information from the M2M/IoT Server.

In step 7, the M2M/IoT server (or PCF1) asks Core network 2 if it is willing to accept DEV1 (using UETransfer Request). As part of this request, the M2M/IoT server (or PCF1) may include any UE context that it has available (communication patterns, observed traffic loads, reachability cycle, location of UE, etc.) The message is sent to AMF2, through NEF2 (or to PCF2). If necessary, PCF1 may communicate to Core Network 2 either directly, via the SEPP, via the NEF, or through the M2M/IoT Server.

In step 8, AMF2 (or PCF2) decides whether it is willing to accept the registration of DEV1. If yes, it may issue a UETransfer Response back to the M2M/IoT server. This may include an indication of a time window to execute this registration. The time window may be used to spread out the registration requests from UEs that are transferred to core network 2. If the time window expires, core network 2 may assume that the UE will not be transferred to core network 2.

Core Network 2 may decide that is not willing to accept the registration of DEV1. This may be because of its own load concerns, or because it has no or little coverage at the location of the UE.

In step 9 of FIG. 10, the M2M/IoT server (or PCF2) responds back to core network 1, with an indication of the UEs that will be transferred, and the new PLMN for these UEs. This information is included in the UETransferInd Response message.

The call flow of FIG. 9 continues in FIG. 10. In step 10 of FIG. 10, AMF1 sends a PLMNUpdate Request to DEV1 with the new PLMN information. This can be through a periodic registration procedure, tracking area update procedure, or through a new dedicated control plane procedure. Alternatively, AMF1 may send an SMS to DEV1 with a USAT REFRESH command qualifier of type "Steering of Roaming", effectively steering DEV1 to the selected PLMN (core network 2).

The request may also include an activation time, to inform the UE when it should attempt a registration on core network 2. If a large number of UEs are transferred to core network 2, this may be used to reduce the signaling load on core network 2, as the activation time may be used to spread out the registration requests to core network 2.

In step 11, DEV1 de-registers from core network 1, and registers with core network 2 at the appropriate time.

As an alternative to Step 10 and Step 11, the PLMNUpdate request may include a time window over which to perform the initial registration on core network 2. DEV1 can then randomly choose a time in this window, to attempt its initial registration.

In order to assist the M2M/IoT server and provide additional UE context information, in Step 4 the AMF1 may ask the UE to report neighbor PLMN information. The UE may then perform a PLMN search, and provide the found PLMN/RAT combinations to core network 1, along with an indication of the received signal strength for the PLMN/RAT combination. Alternatively, the UE could be configured to periodically measure the signal strength of neighbor PLMNs, and report the signal information to core network1. This neighbor PLMN information may be included as part of the UE context information provided to the M2M/IoT server in Step 5.

PLMN Reselection Triggered by M2M/IoT Server

The M2M/IoT server may gather information and detect conditions that may be beneficially addressed by transferring some UEs from one PLMN to another PLMN.

Owing to the location of the M2M/IoT server in the communication path between the core networks and M2M/IoT applications, the M2M/IoT server is in a unique position to collect context information from both and make determinations of the optimum PLMN to serve a device. The details are shown in FIGS. 11-14 and described below.

Figure 11:
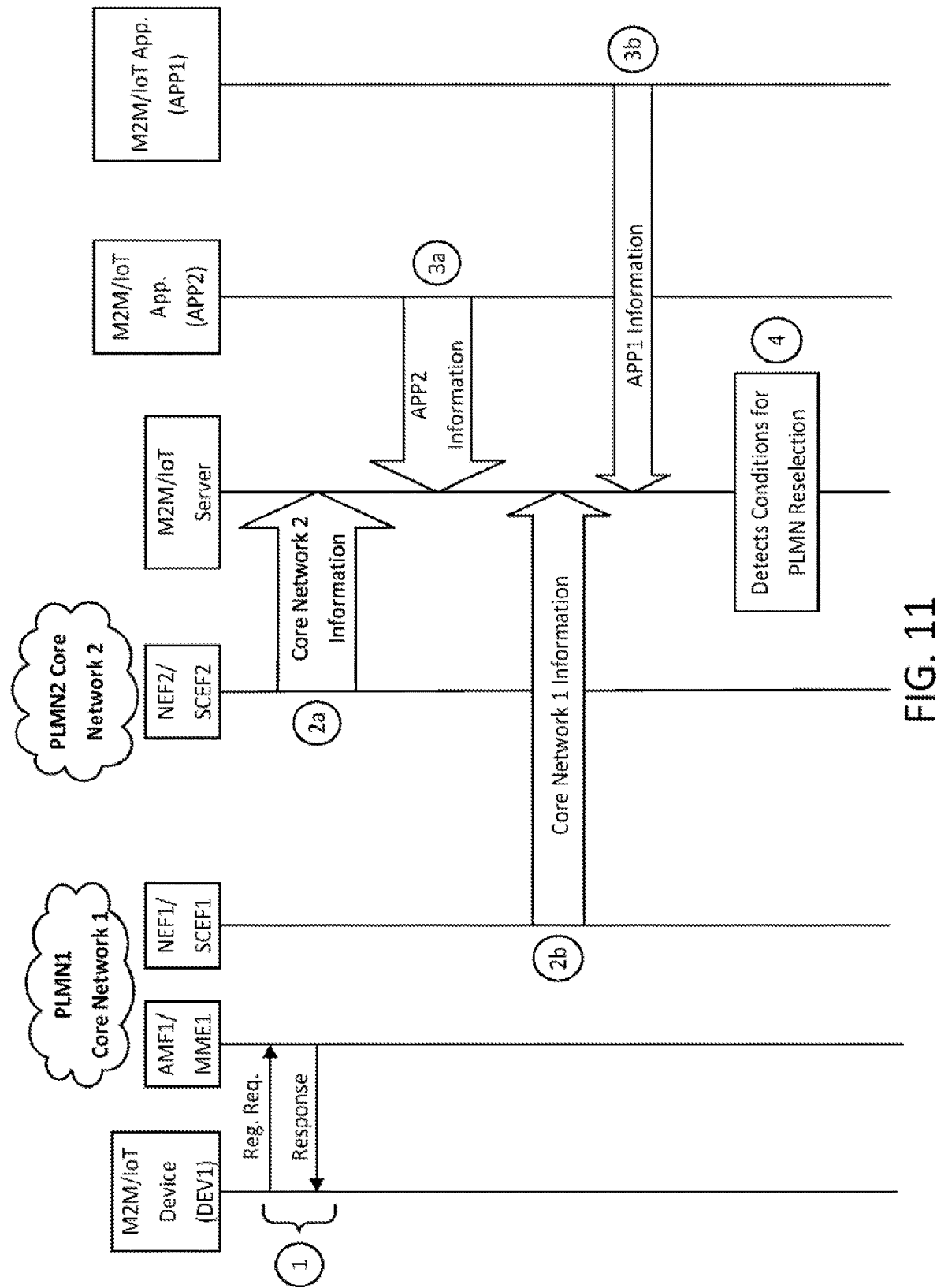
FIGS. 11-14 show a call flow of an example method for PLMN reselection triggered by an M2M/IoT server.

In step 1 of FIG. 11 is identical to step 1 of FIG. 8.

In step 2*a*/2*b*, the M2M/IoT server collects context information from the core networks. For example, this may include load information, e.g., per cell, tracking area, network slice, UE, and group of UEs. The information may include network capacity information, such as historical network usage for different periods, e.g., per hour, per day, per week, per holiday, etc. Similarly, the information may include UEs that are part of a multicast group and UEs that are using unlicensed or shared spectrum, as well as the type of spectrum.

The M2M/IoT server may subscribe to have this information provided periodically and/or upon change. The subscriptions may be configured on the NWDAF, PCF, AMF, or UDM/UDR via the NEF.

In steps 3*a* and 3*b*, the M2M/IoT Server collects information from the M2M/IoT applications. For example, the server may collect the overall demand from each M2M/IoT application, e.g., in the form of communication patterns for different periods.

In step 4, the M2M/IoT server uses the context information and network status information to determine if certain devices may need to be transferred from one PLMN to another. For example, the M2M/IoT server may determine to transfer UEs for purposes of load balancing, sharing multicast groups, minimizing interference on shared spectrum, or optimizing resource and service allocation, for example.

For load balancing, for example, the M2M/IoT server can aggregate the demands of all the M2M/IoT applications and determine the overall demand for each UE. It also knows the available capacity of each of the core networks. M2M/IoT server may dynamically match the demand to the available capacity in order spread the load of these UEs across all the core networks. For example, it may determine that DEV1 should be on core network 1 from 8 AM to 3 PM, and on core network 2 otherwise.

For sharing multicast groups, the M2M/IoT server may know that it has a multicast message to send to a group of UEs. Part of this group of UEs is registered with core network 1 (SubGroup1), while the remainder of the group is registered with core network 2 (SubGroup2). Rather than using a separate multicast group in each core network, the M2M/IoT server would like to create a single multicast group in only one network. As a result, it transfers all the UEs from one subgroup to the other core network. For example, the M2M/IoT server may determine that it needs to regularly send a multicast message to DEV1, and 20 other devices. The 20 other devices are registered to core network 2 and are part or multicast group in that network. To take advantage of this existing group, and avoid sending the multicast message to 2 different core networks, the M2M/IoT server may ask DEV1 to register to core network 2.

For minimizing interference on shared spectrum, the M2M/IoT server may determine that it communicates to two sets of UEs that are using the same shared spectrum. Set 1 UEs are registered to Core Network 1 while Set 2 UEs are registered to Core Network 2. The M2M/IoT server may also know that these devices are in vicinity of each other. As each of the two networks manages their shared spectrum individually, the UEs registered in the 2 networks compete against each other. Moving the 2 sets of UEs to a single core network allows the core network to better coordinate traffic to and from these UEs and minimize interference.

For optimizing resource and service allocation, the M2M/IoT server may determine that one or more UEs do not need full network services for a specific duration. In this case the M2M/IoT server may request the transfer of these UEs to a PLMN which supports "Restricted Access for Network Selection Assistance" on purpose, and for a specific duration. This is followed later by PLMN re-selection to a PLMN where the UE may receive full network services.

Figure 12:
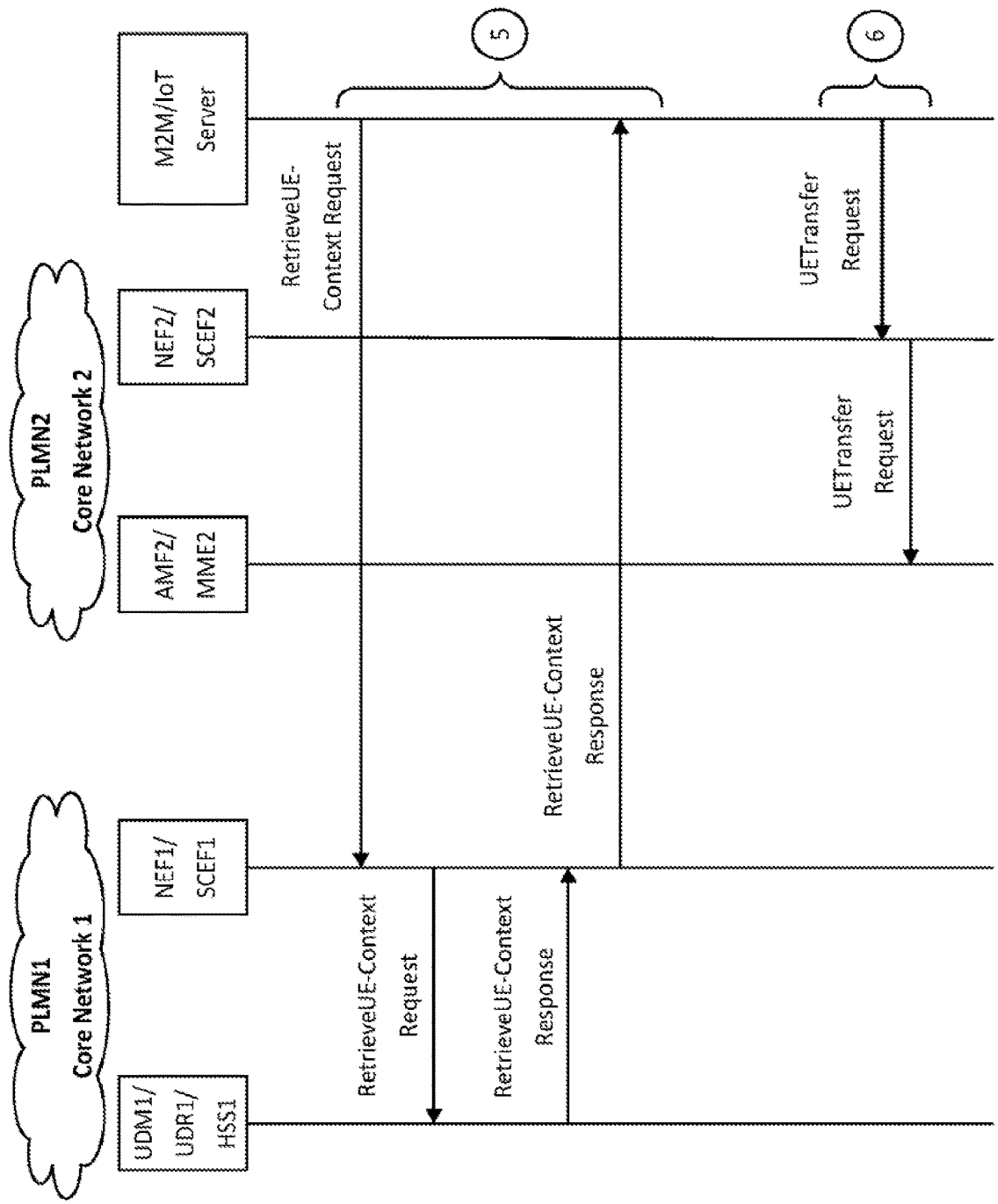

The call flow of FIG. 11 continues in FIG. 12.

In step 5, of FIG. 12, once the M2M/IoT server has determined that it would prefer to transfer DEV1 from core network 1 to core network 2, it may need to retrieve other UE context information for Dev1. For example, it may need to verify that DEV1 is capable of PLMN transfers.

Figure 13:
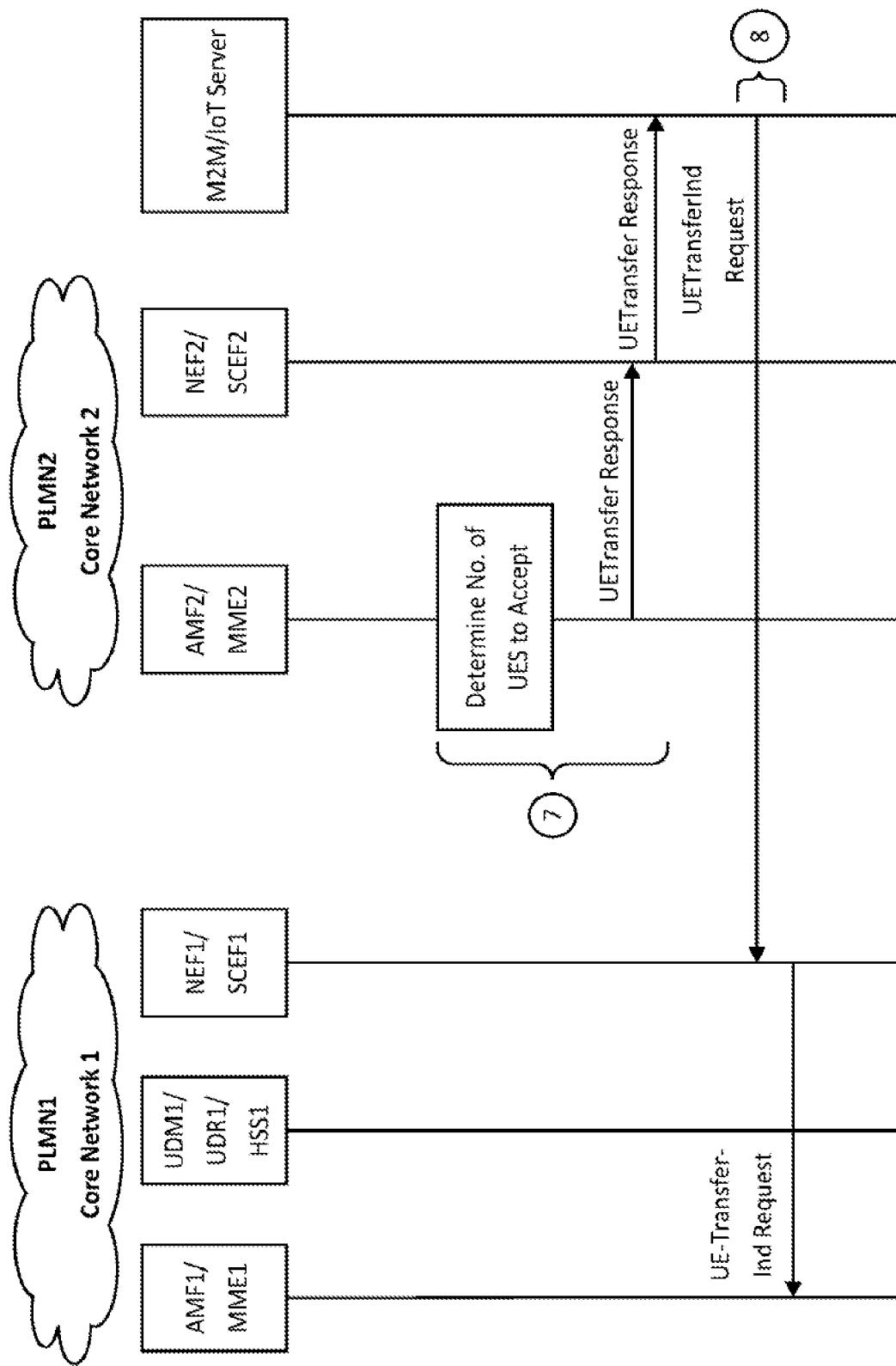
Figure 14:
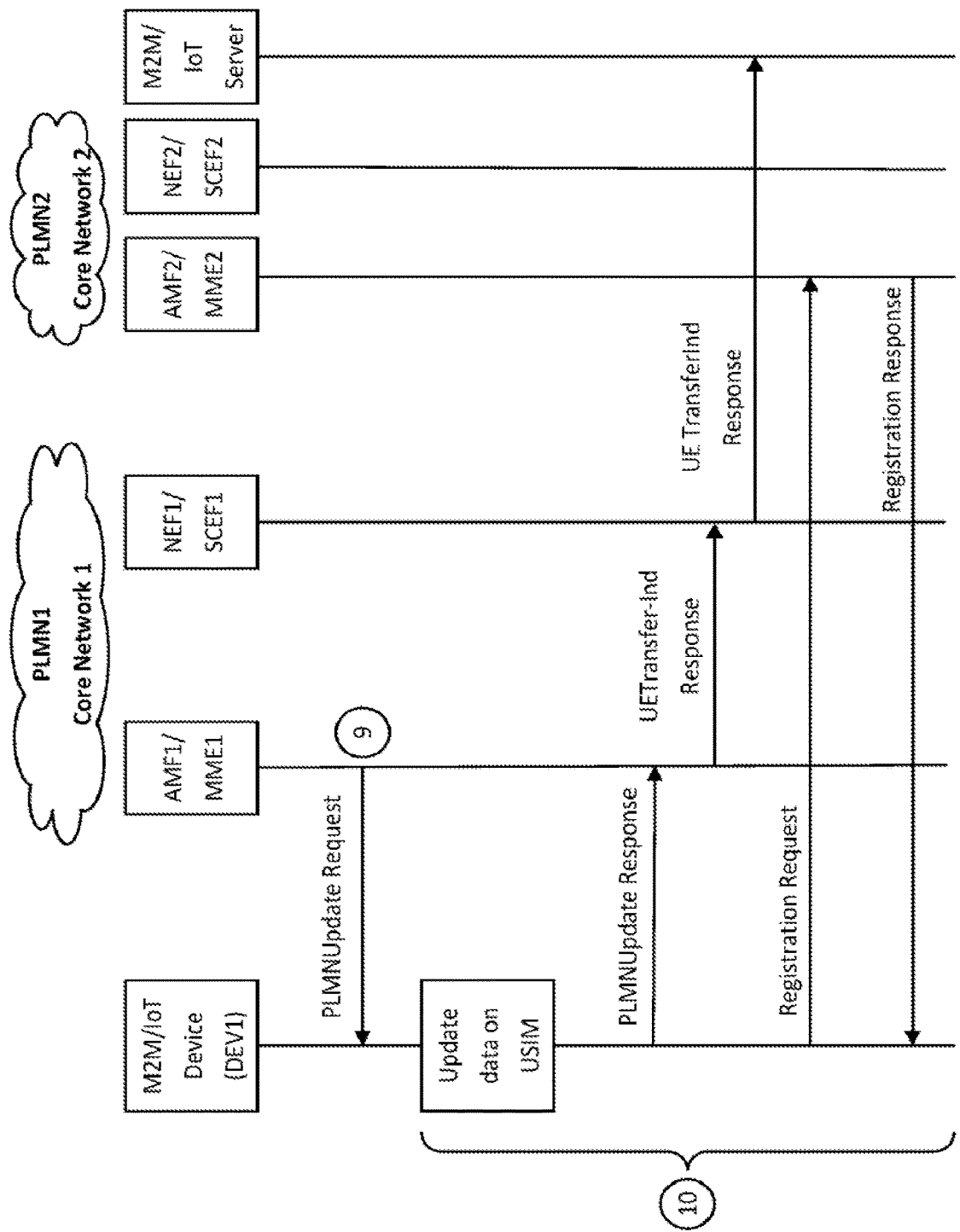

Steps 6-10 of FIGS. 12, 13, and 14 are similar to steps 7-11 of FIGS. 9 and 10.

Proactive PLMN Selection Lists

The M2M/IoT server is also capable of determining a set of PLMN lists and supplying this set to the UE. The UE may then use a local policy to determine which PLMN list to use. The policy may be based on one or more of the following: UE location, UE load, applications running on UE, etc.

The M2M/IoT server may collect information from the PLMNs (coverage maps, load, etc.) and the Application servers (served UEs, UE trajectory, etc.) and from this determine one or more PLMN Selection lists. These selection lists may then be transferred to the UE through NAS signaling or through some USAT command targeting the USIM within the UE. The UE may then regularly use its local policy to select among the PLMN selection list and perform a PLMN selection/reselection.

For example, based on the information collected from the core networks and the application servers, the M2M/IoT server may generate a number of PLMN selection lists, which are based on the UE's current location and current active applications. For example, the server may create the following five lists:

PLMN List 1: Location: City A, UE applications: any
PLMN List 2: Location: City B, UE applications: any
PLMN List 3: Location: elsewhere, UE applications: Application 1
PLMN List 4: Location: elsewhere, UE applications: Application 2
PLMN List 5: default The M2M/IoT server may then send these lists to the UE, for example through a USAT command or through the core network to which the UE is currently registered.

The UE updates its lists, and uses its local policy to determine which list to use. If no valid condition matching a list is found, the UE may use the default PLMN List 5.

Non-Roaming—Visited Routing

An M2M/IoT device with limited radio access capabilities, may not be able to be transferred to another PLMN. In such cases an alternative roaming scheme called Non-Roaming—Visited Routing may be used.

In the discussions of FIGS. 6-14, it has been assumed that the M2M/IoT device is either registered to its Home PLMN or is transferred to another PLMN, e.g., a visiting PLMN. As far as the network is concerned, when a UE is transferred from its home PLMN to a visiting PLMN, it is effectively roaming. 3GPP defines two variants of roaming: local breakout and Home routed. Both variants refer to the user plane path. In the local breakout case, the user plane path stays in the visited PLMN and the VPLMN routes the data to the data network. In the home routed case, the user plane path returns to the home PLMN, and the HPLMN routes the data to the data network. These three alternatives—non-roaming, local breakout roaming, and home routed roaming—are illustrated in configurations a, b, and c, respectively, in FIG. 15.

Figure 15:
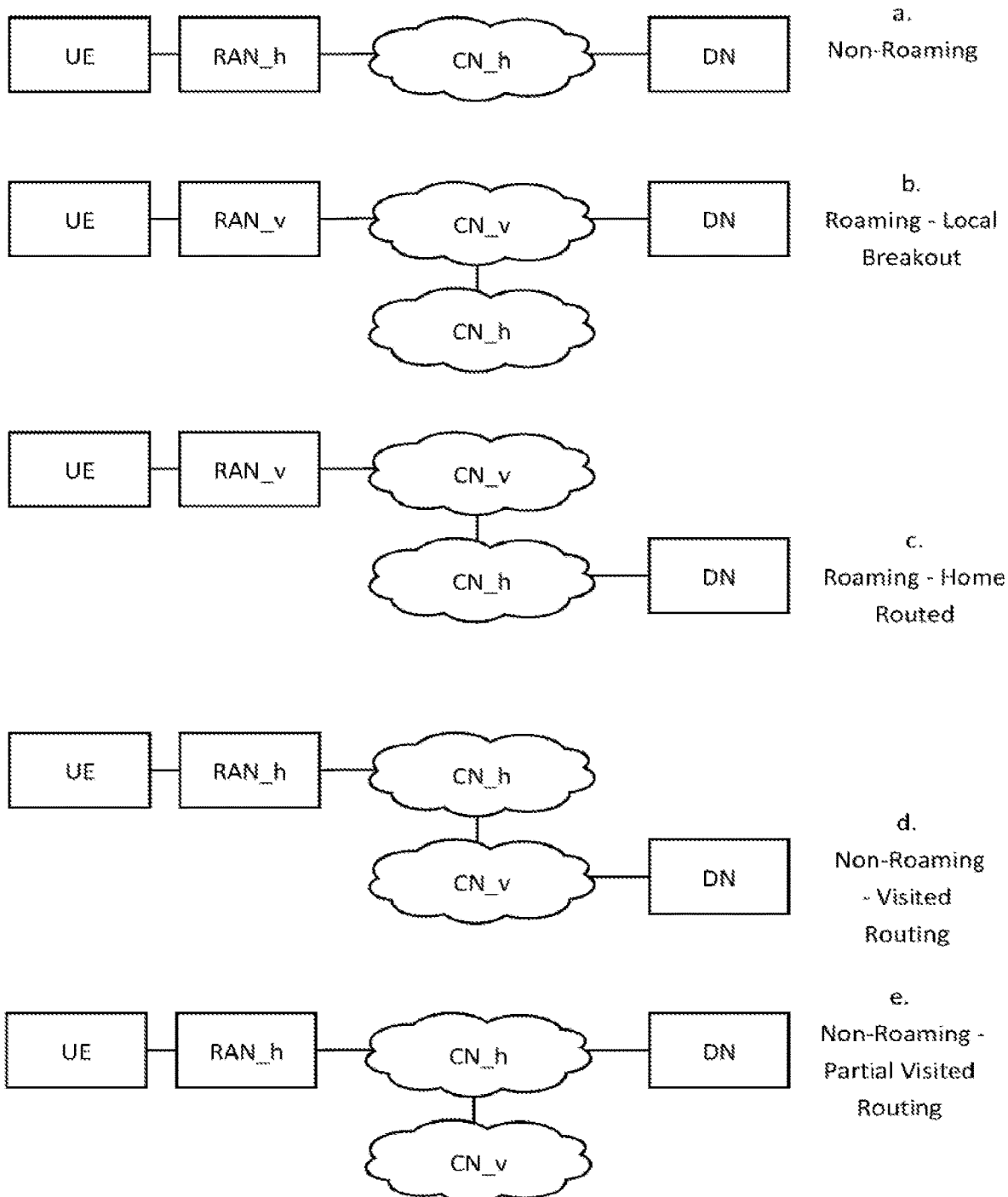
FIG. 15 shows example roaming alternatives.

FIG. 15 shows a total of six functional entities in five configurations. The first entity is the UE, which is the device requiring service from a wireless operator. The UE connects to a RAN entity based on its radio access capability. The second entity is the RAN_h, which is a radio access network functional entity of the Home PLMN. The RAN_h corresponds to a specific technology and frequency band.

The third entity is the RAN_v, which is a radio access network functional entity of a Visited PLMN. The RAN_v corresponds to a specific technology and frequency band. The entity fourth is the CN_h, which is the core network functional entity of the Home PLMN. It corresponds to a specific type (e.g. EPC, 5GS) and a specific capability (e.g. slices supported, services supported).

The fifth entity is the CN_v, which is the core network functional entity of the Visited PLMN. It corresponds to a specific type (e.g. EPC, 5GS) and a specific capability, e.g., slices supported and services supported. The sixth entity is the DN, which is the data network with which the UE wishes to communicate.

For simplicity, FIG. 15 omits the inner network functions of the core network.

For M2M/IoT devices a fourth roaming alternative is possible. In some cases, an M2M/IoT device will only support a single RAT and only the band of its preferred operator. These devices will only be able to connect to the RAN of the HPLMN.

Similarly, in some cases an operator may not want to instantiate a dedicated network slice for only a few M2M/IoT devices. Rather it may want to leverage its relationship with another operator which does provide the dedicated network slice. It may want to push these devices to this other operator.

However, owing to their RAT limitations, these M2M/IoT devices will not be able to connect to the RAN of the other operator as the device does not support the RAN and/or band. For such devices, another roaming alternative is proposed, referred to as Non-Roaming Visited Routing (shown as "d" in FIG. 15.) In this alternative, the UE connects to the RAN_h (the RAN of the Home PLMN). The control plane and user plane traffic are then routed to the visited PLMN (CN_v) which offers the advanced services needed by the UEs. This saves the home PLMN from offering these services.

Note that the functionality within CN_h can be variable. For instance it may have minimal functionality just to support the inter-PLMN communication. It may provide part of the control plane functionality, or it may provide the full user plane functionality. Similarly, it may provide access to the data network through its NEF, e.g., with a UPF in the CN_v sending/receiving user plane traffic to/from the NEF of CN_h.

As the latter two cases above rely on the HPLMN for routing the traffic to the DN, they are classified as "Non-Roaming—Partial Visited Routing", in order to distinguish them from the other cases. The alternative is shown in e) of FIG. 15.

Figure 16:
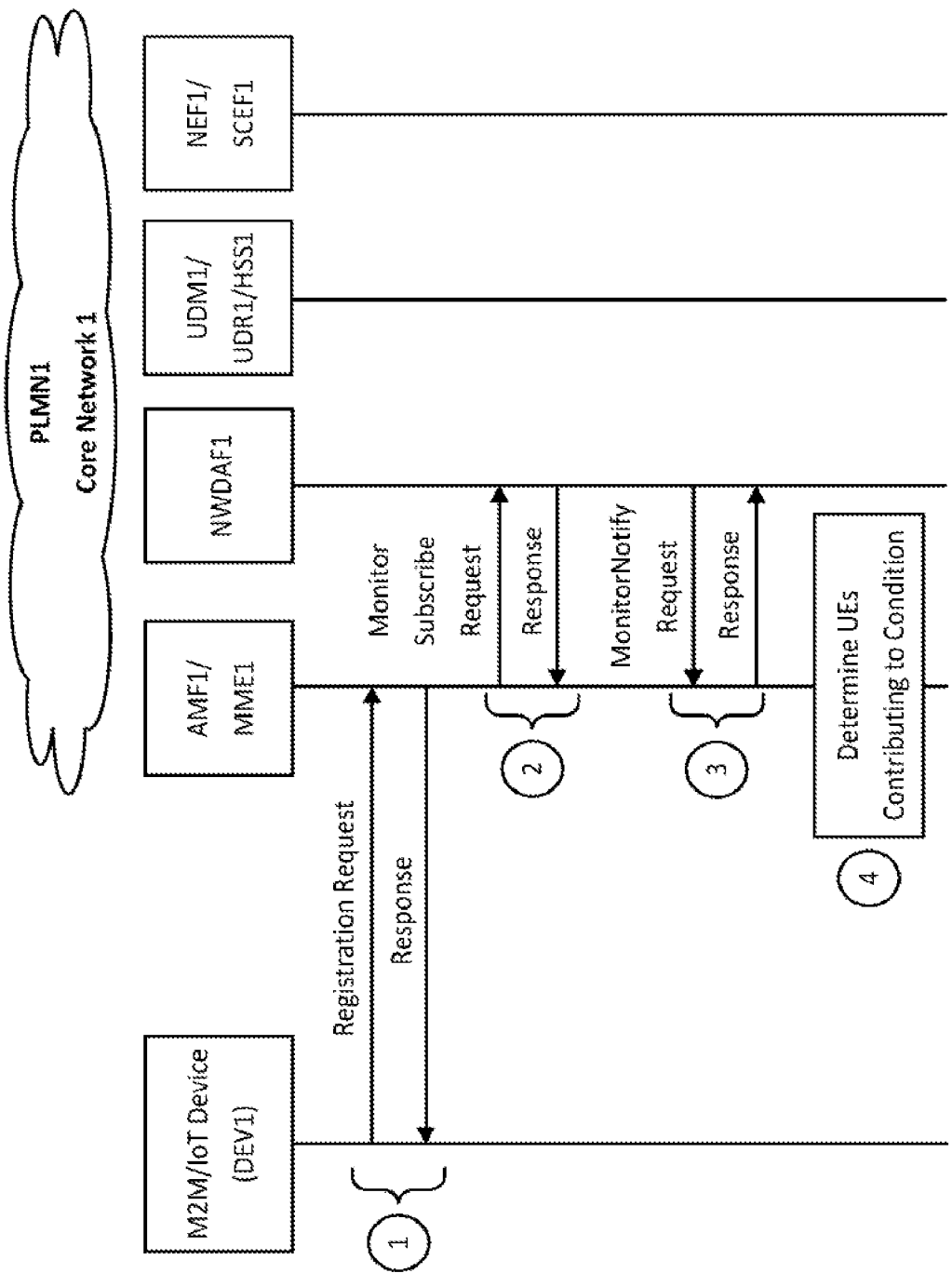
FIGS. 16-18 show a call flow illustrating an example method for PLMN reselection to a non-roaming—visited routing PLMN)
Figure 17:
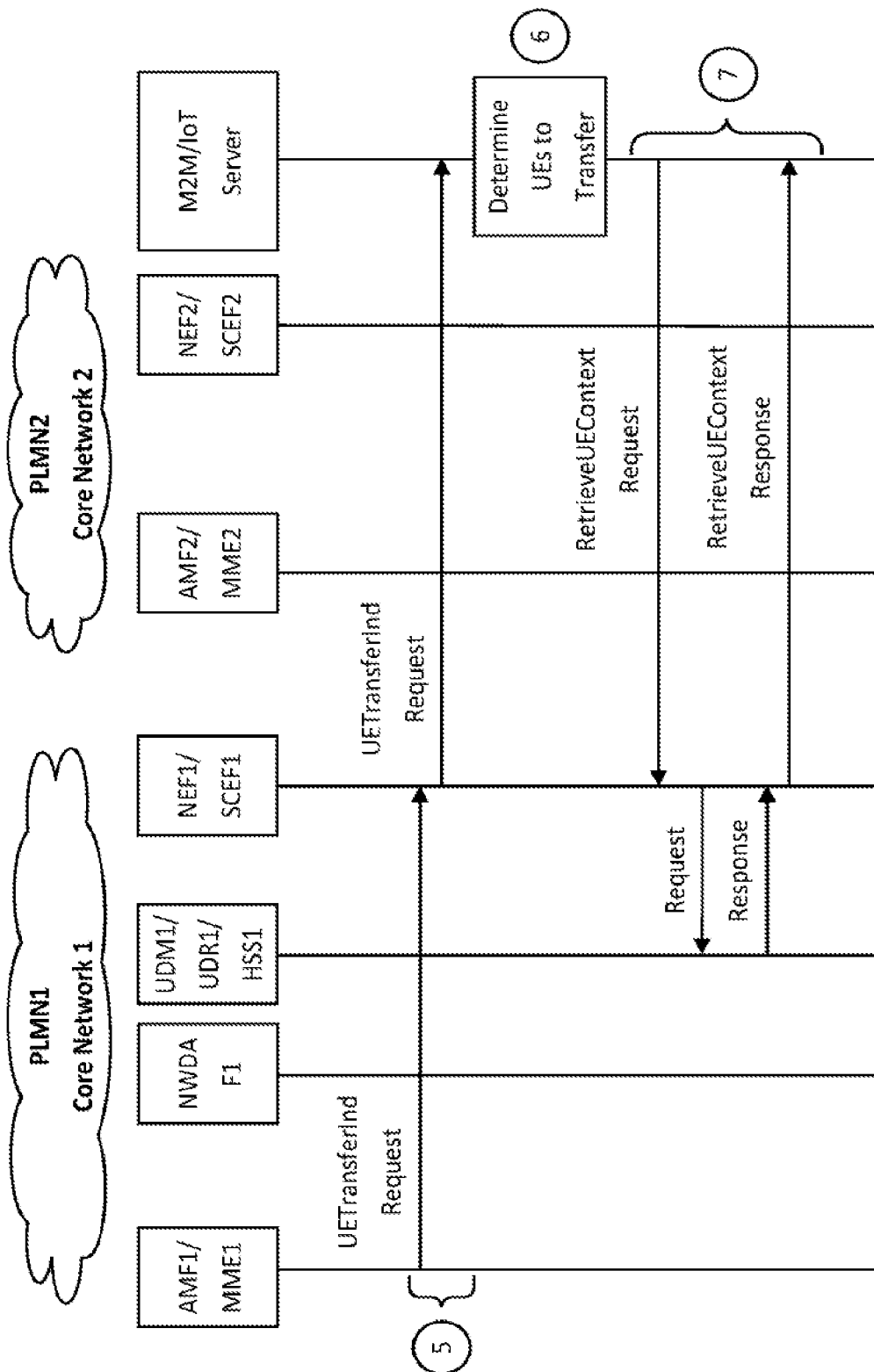
Figure 18:
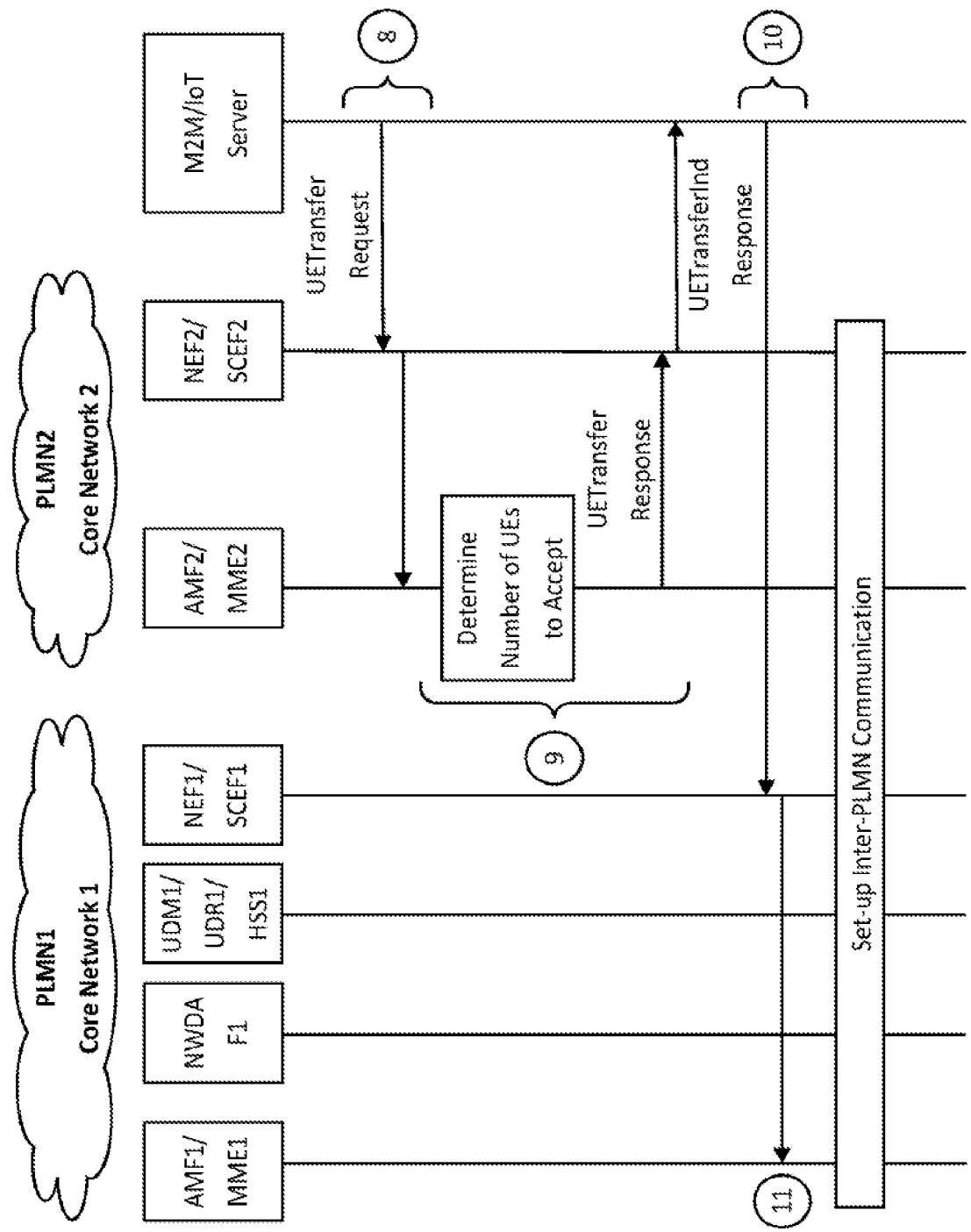

This roaming alternative may be used in any of the PLMN transfers described in connection with FIGS. 6-14. To support such transfers, it is proposed that the entity triggering the transfer may specify what type of transfer it is requesting (roaming—local breakout, roaming—home routed, non-roaming—visited routing). The specific details are shown in FIGS. 16-18 for the core network triggered PLMN Reselection. Note that for legibility and simplicity, the call flows of FIGS. 6-18 are each split across several pages of figures. Further, entities participating in the call flow may be omitted on individual pages of drawings to avoid clutter.

Steps 1-6 of FIGS. 16 and 17 are analogous to steps 1-6 of FIGS. 8 and 9.

In step 7 of FIG. 17, once the M2M/IoT server has determined the UEs to transfer, it may need additional UE information from core network 1, such as the UE radio access capability, for example.

The call flow of FIGS. 16 and 17 continues in FIG. 18. In step 8 of FIG. 18, the M2M/IoT server asks Core network 2 it is willing to accept DEV1, e.g., using a UETransfer Request. As part of this request, the M2M/IoT server may include any UE context that it has available (communication patterns, observed traffic loads, reachability cycle, UE radio access capability, the type of transfer (roaming—local breakout, roaming—home routed, non-roaming—visited routing), etc.). The message is sent to AMF2 (or PCF2), through NEF2.

In step 9, AMF2 (or PCF2) decides whether it is willing to accept the registration of DEV1. If yes, it issues a UETransfer Response back to the M2M/IoT server. This may include an indication of a time window to execute this registration. It may also indicate that the UE can only be served using non-roaming—visited routing.

In step 10, the M2M/IoT server responds back to core network 1, with an indication of the UEs that will be transferred, the new PLMN for these UEs, and the roaming alternative to use for these UEs. This information is included in the UETransferInd Response message.

In step 11, if DEV1 has been selected to use a non-roaming—visited routing alternative, AMF1 will set up the inter-PLMN communication between the two PLMNs, e.g., as may be done for the roaming alternatives.

The UE is unaware of this PLMN change, and it continues to use the same RAN. Once the RAN node forwards the user plane and control plane traffic to core network 1, it is the responsibility of core network 1 to route this traffic to core network 2

As an alternative, RAN_h may have a connection to both CN_h and CN_v, e.g., in a shared network configuration. RANs in the HPLMN may broadcast that they are shared cells, e.g., shared between CN_h and CN_v. From the broadcast information, the UE may know the core networks available through the cell, as well as the capabilities of each of these cells, e.g., in terms of network slices supported. In this alternative, Step 11 of FIG. 18 would be replaced by an AMF change procedure, where the AMF serving the UE is changed from AMF1 to AMF2.

Graphical User Interface

Figure 19:
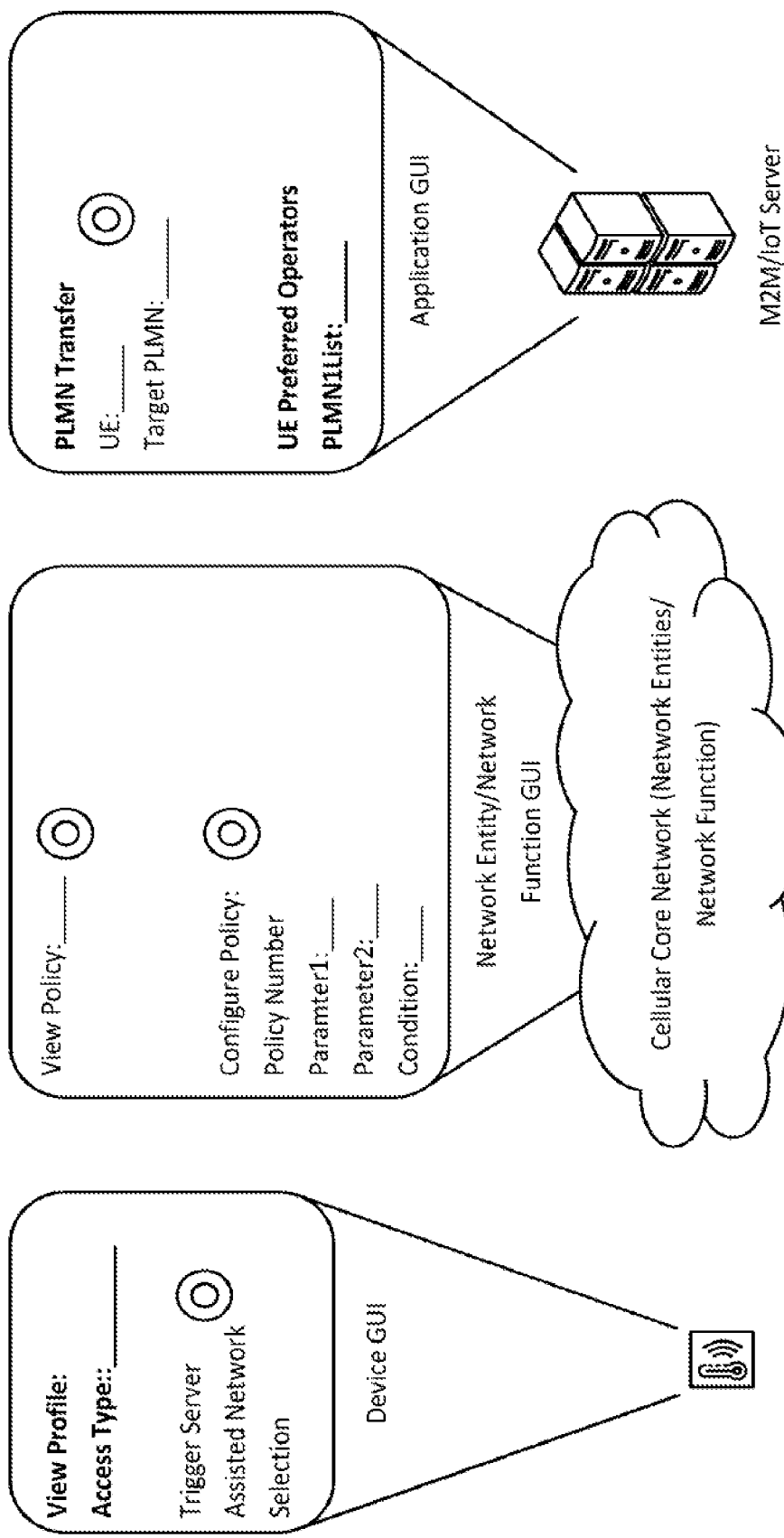
FIG. 19 illustrates example graphical user interfaces.

FIG. 19 shows an example deployment with the three Graphical User Interfaces (GUIs). A (GUI) may be implemented within the core network, at the M2M/IoT Server, or at the M2M/IoT device, for example. The interface may be used to trigger certain actions described in this document as well as view status related to the PLMN transfer operation.

A GUI may be used at the UE to view the type of access of a UE (e.g., restricted access for network selection assistance, RLOS, normal), or to trigger a server assisted network selection, for example.

A GUI may be used in the Core Network to configure or view PLMN selection policies for non-coverage related PLMN transfers, for example. For instance, to configure a policy where a UE is transfer if the buffering load in the core network exceeds 70% of maximum, and the number of registered UEs is above 1000.

A GUI may be used in the M2M/IoT server to trigger a PLMN transfer for a UE or group of UEs, for example. This may include the target PLMN for each UE. A GUI may be used in the M2M/IoT server to enter the preferred operators of a UE or group of UEs.

Example Architectures

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 7 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

Figure 20:
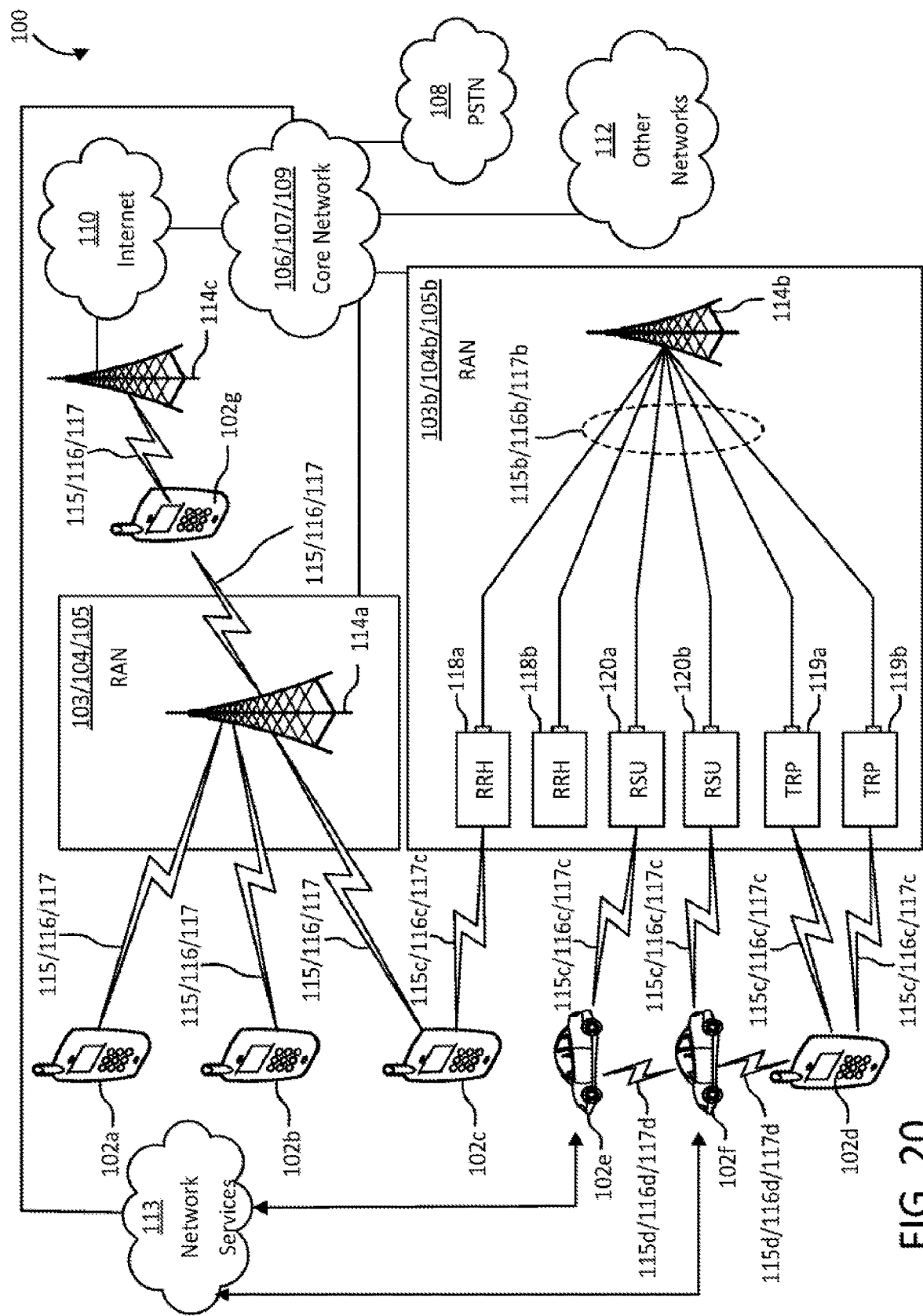
FIG. 20 illustrates an example communications system.

FIG. 20 illustrates an example communications system 100 in which the systems, methods, and apparatuses described and claimed herein may be used. The communications system 100 may include wireless transmit/receive units (WTRUs) 102a, 102b, 102c, 102d, 102e, 102f, and/or 102g, which generally or collectively may be referred to as WTRU 102 or WTRUs 102. The communications system 100 may include, a radio access network (RAN) 103/104/

105/103b/104b/105b, a core network 106/107/109, a public switched telephone network (PSTN) 108, the Internet 110, other networks 112, and Network Services 113. 113. Network Services 113 may include, for example, a V2X server, V2X functions, a ProSe server, ProSe functions, IoT services, video streaming, and/or edge computing, etc.

It will be appreciated that the concepts disclosed herein may be used with any number of WTRUs, base stations, networks, and/or network elements. Each of the WTRUs 102 may be any type of apparatus or device configured to operate and/or communicate in a wireless environment. In the example of FIG. 20, each of the WTRUs 102 is depicted in FIGS. 20-24 as a hand-held wireless communications apparatus. It is understood that with the wide variety of use cases contemplated for wireless communications, each WTRU may comprise or be included in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus or truck, a train, or an airplane, and the like.

The communications system 100 may also include a base station 114a and a base station 114b. In the example of FIG. 20, each base stations 114a and 114b is depicted as a single element. In practice, the base stations 114a and 114b may include any number of interconnected base stations and/or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, and/or the other networks 112. Similarly, base station 114b may be any type of device configured to wiredly and/or wirelessly interface with at least one of the Remote Radio Heads (RRHs) 118a, 118b, Transmission and Reception Points (TRPs) 119a, 119b, and/or Roadside Units (RSUs) 120a and 120b to facilitate access to one or more communication networks, such as the core network 106/107/109, the Internet 110, other networks 112, and/or Network Services 113. RRHs 118a, 118b may be any type of device configured to wirelessly interface with at least one of the WTRUs 102, e.g., WTRU 102c, to facilitate access to one or more communication networks, such as the core network 106/107/109, the Internet 110, Network Services 113, and/or other networks 112.

TRPs 119a, 119b may be any type of device configured to wirelessly interface with at least one of the WTRU 102d, to facilitate access to one or more communication networks, such as the core network 106/107/109, the Internet 110, Network Services 113, and/or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, and/or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations and/or network elements (not shown), such as a Base Station Controller (BSC), a Radio Network Controller (RNC), relay nodes, etc. Similarly, the base station 114b may be part of the RAN 103b/104b/105b, which may also include other base stations and/or network elements (not shown), such as a BSC, a RNC, relay nodes, etc. The base station 114a may be configured to transmit and/or receive wireless signals within a particular geographic region, which may be referred to as a cell (not shown). Similarly, the base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, for example, the base station 114a may include three transceivers, e.g., one for each sector of the cell. The base station 114a may employ Multiple-Input Multiple Output (MIMO) technology and, therefore, may utilize multiple transceivers for each sector of the cell, for instance.

The base station 114a may communicate with one or more of the WTRUs 102a, 102b, 102c, and 102g over an air interface 115/116/117, which may be any suitable wireless communication link (e.g., Radio Frequency (RF), microwave, infrared (IR), ultraviolet (UV), visible light, cmWave, mmWave, etc.). The air interface 115/116/117 may be established using any suitable Radio Access Technology (RAT).

The base station 114b may communicate with one or more of the RRHs 118a and 118b, TRPs 119a and 119b, and/or RSUs 120a and 120b, over a wired or air interface 115b/116b/117b, which may be any suitable wired (e.g., cable, optical fiber, etc.) or wireless communication link (e.g., RF, microwave, IR, UV, visible light, cmWave, mmWave, etc.). The air interface 115b/116b/117b may be established using any suitable RAT.

The RRHs 118a, 118b, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., RF, microwave, IR, ultraviolet UV, visible light, cmWave, mmWave, etc.) The air interface 115c/116c/117c may be established using any suitable RAT.

The WTRUs 102 may communicate with one another over a direct air interface 115d/116d/117d, such as Sidelink communication which may be any suitable wireless communication link (e.g., RF, microwave, IR, ultraviolet UV, visible light, cmWave, mmWave, etc.) The air interface 115d/116d/117d may be established using any suitable RAT.

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and/or RSUs 120a and 120b in the RAN 103b/104b/105b and the WTRUs 102c, 102d, 102e, and 102f, may implement a radio technology such as Universal Mobile Telecommunications System (UMTS) Terrestrial Radio Access (UTRA), which may establish the air interface 115/116/117 and/or 115c/116c/117c respectively using Wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

The base station 114a in the RAN 103/104/105 and the WTRUs 102a, 102b, 102c, and 102g, or RRHs 118a and 118b, TRPs 119a and 119b, and/or RSUs 120a and 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A), for example. The air interface 115/116/117 or 115c/116c/117c may implement 3GPP NR technology. The LTE and LTE-A technology may include LTE D2D and/or V2X technologies and interfaces (such as Sidelink communications, etc.) Similarly, the 3GPP NR technology may include NR V2X technologies and interfaces (such as Sidelink communications, etc.)

The base station 114a in the RAN 103/104/105 and the WTRUs 102a, 102b, 102c, and 102g or RRHs 118a and 118b, TRPs 119a and 119b, and/or RSUs 120a and 120b in the RAN 103b/104b/105b and the WTRUs 102c, 102d, 102e, and 102f may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 20 may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like. The base station 114c and the WTRUs 102, e.g., WTRU 102e, may implement a radio technology such as IEEE 802.11 to establish a Wireless Local Area Network (WLAN). Similarly, the base station 114c and the WTRUs 102, e.g., WTRU 102d, may implement a radio technology such as IEEE 802.15 to establish a wireless personal area network (WPAN). The base station 114c and the WTRUs 102, e.g., WRTU 102e, may utilize a cellular-based RAT (e.g., WCDMA, CDMA2000, GSM, LTE, LTE-A, NR, etc.) to establish a picocell or femtocell. As shown in FIG. 20, the base station 114c may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, messaging, authorization and authentication, applications, and/or Voice Over Internet Protocol (VoIP) services to one or more of the WTRUs 102. For example, the core network 106/107/109 may provide call control, billing services, mobile location-based services, pre-paid calling, Internet connectivity, packet data network connectivity, Ethernet connectivity, video distribution, etc., and/or perform high-level security functions, such as user authentication.

Although not shown in FIG. 20, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102 to access the PSTN 108, the Internet 110, and/or other networks 112. The PSTN 108 may include circuit-switched telephone networks that provide Plain Old Telephone Service (POTS). The Internet 110 may include a global system of interconnected computer networks and devices that use common communication protocols, such as the Transmission Control Protocol (TCP), User Datagram Protocol (UDP), and the internet protocol (IP) in the TCP/IP internet protocol suite. The other networks 112 may include wired or wireless communications networks owned and/or operated by other service providers. For example, the networks 112 may include any type of packet data network (e.g., an IEEE 802.3 Ethernet network) or another core network connected to one or more RANs, which may employ the same RAT as the RAN 103/104/105 and/or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links. For example, the WTRU 102g shown in FIG. 20 may be configured to communicate with the base station 114a, which may employ a cellular-based radio technology, and with the base station 114c, which may employ an IEEE 802 radio technology.

Although not shown in FIG. 20, it will be appreciated that a User Equipment may make a wired connection to a gateway. The gateway maybe a Residential Gateway (RG). The RG may provide connectivity to a Core Network 106/107/109. It will be appreciated that many of the ideas contained herein may equally apply to UEs that are WTRUs and UEs that use a wired connection to connect to a network. For example, the ideas that apply to the wireless interfaces 115, 116, 117 and 115c/116c/117c may equally apply to a wired connection.

Figure 21:
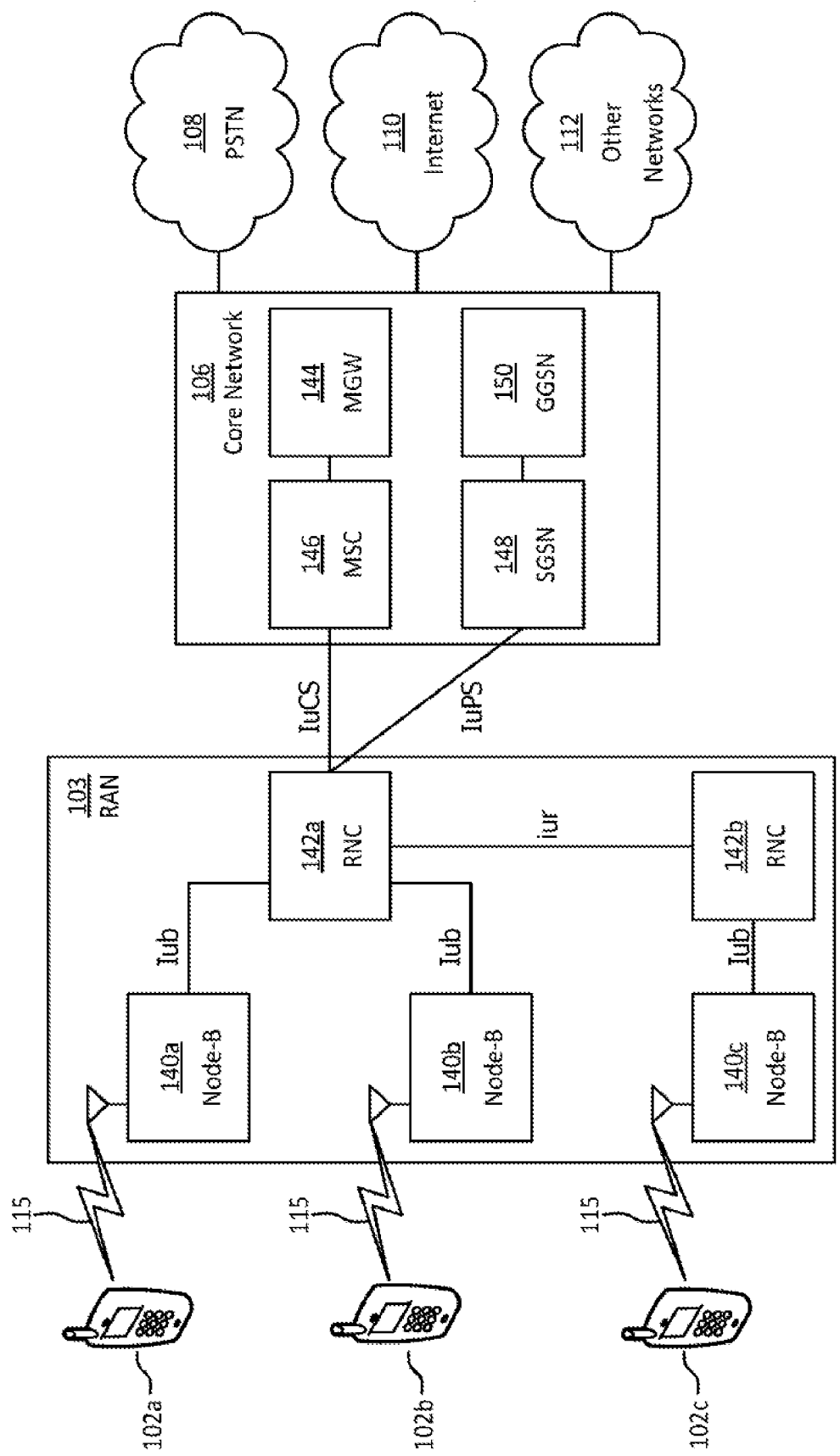
FIGS. 21, 22, and 23 are system diagrams of example RANs and core networks.

FIG. 21 is a system diagram of an example RAN 103 and core network 106. As noted above, the RAN 103 may employ a UTRA radio technology to communicate with the WTRUs 102a, 102b, and 102c over the air interface 115. The RAN 103 may also be in communication with the core network 106. As shown in FIG. 21, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 21, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 21 may include a media gateway (MGW) 144, a Mobile Switching Center (MSC) 146, a Serving GPRS Support Node (SGSN) 148, and/or a Gateway GPRS Support Node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned and/or operated by other service providers.

Figure 22:
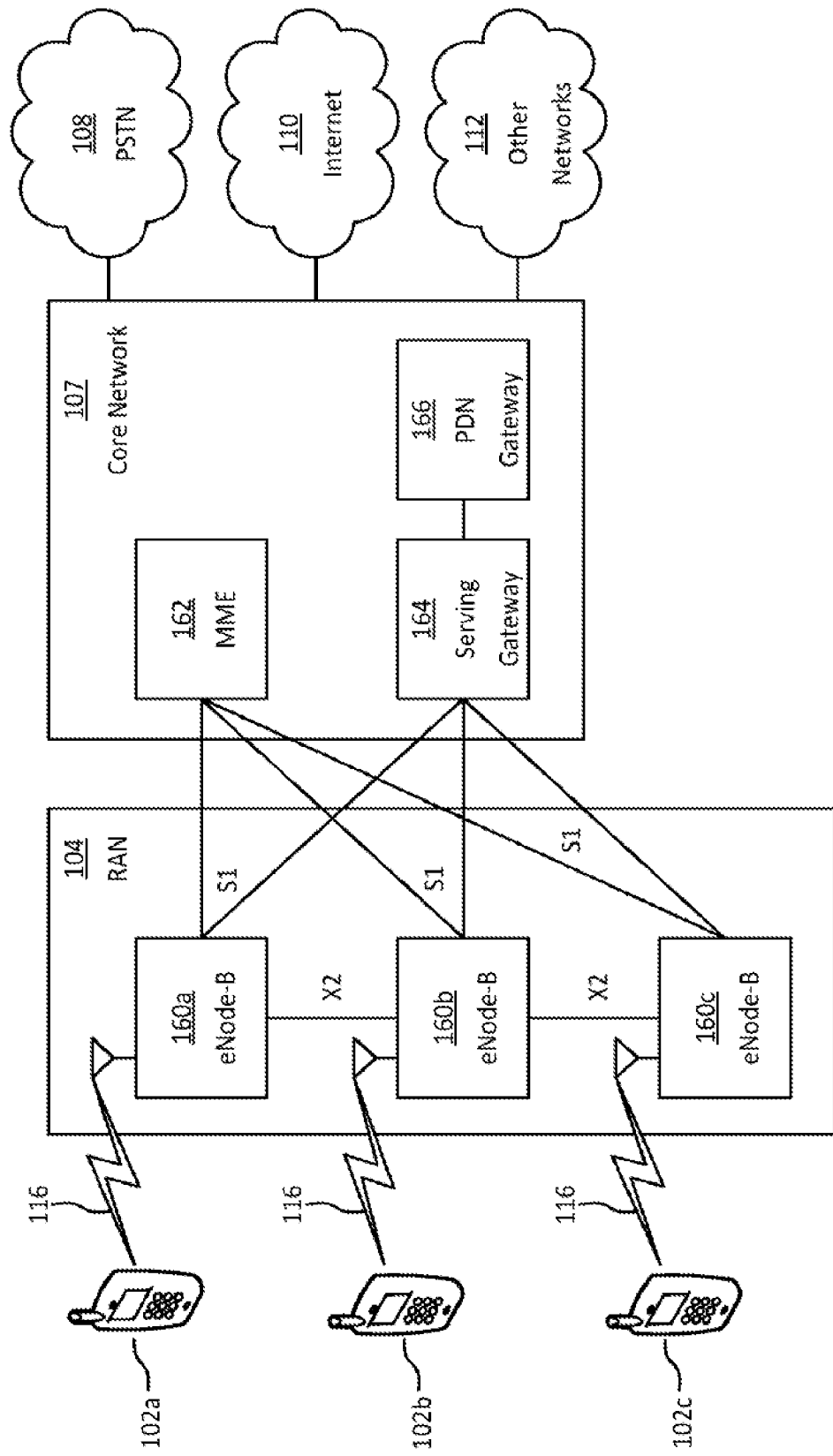

FIG. 22 is a system diagram of an example RAN 104 and core network 107. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 22, the eNode-Bs 160a, 160b, and 160c may communicate with one another over an X2 interface.

The core network 107 shown in FIG. 22 may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned and/or operated by other service providers.

Figure 23:
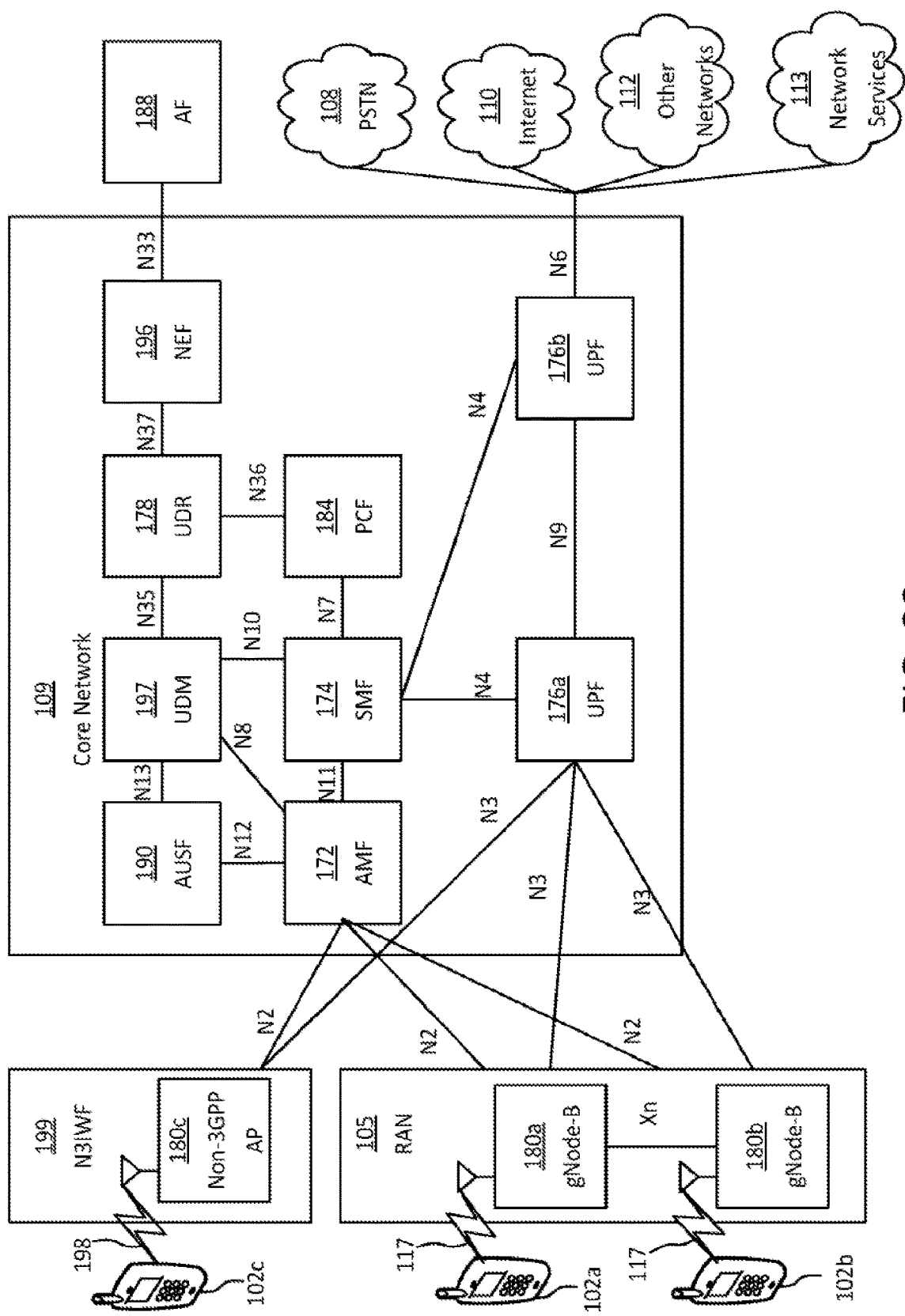

FIG. 23 is a system diagram of an example RAN 105 and core network 109. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, and/or digital beamforming technology. Thus, the gNode-B 180a, for example, may use multiple antennas to transmit wireless signals to, and receive wireless signals from, the WTRU 102a. It should be appreciated that the RAN 105 may employ other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink and/or downlink, and the like. As shown in FIG. 23, the gNode-Bs 180a and 180b may communicate with one another over an Xn interface, for example.

The core network 109 shown in FIG. 23 may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless and/or network communications or a computer system, such as system 90 illustrated in FIG. 26.

In the example of FIG. 23, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned and/or operated by an entity other than the core network operator. It will also be appreciated that a 5G core network may not consist of all of these elements, may consist of additional elements, and may consist of multiple instances of each of these elements. FIG. 23 shows that network functions directly connect to one another, however, it should be appreciated that they may communicate via routing agents such as a diameter routing agent or message buses.

In the example of FIG. 23, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 23.

The SMF 174 may be connected to the AMF 172 via an N11 interface. Similarly the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF 176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 23. The PCF 184 may provide policy rules to control plane nodes such as the AMF 172 and SMF 174, allowing the control plane nodes to enforce these rules. The PCF 184, may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect to network functions, so that network function can add to, read from, and modify the data that is in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access of the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 23, in a network slicing scenario, a WTRU 102a, 102b, or 102c may connect to an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned and/or operated by other service providers.

The core network entities described herein and illustrated in FIGS. 20, 22, 23, and 24 are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 20, 21, 22, 23, and 24 are provided by way of example only, and it is understood that the subject matter disclosed and claimed herein may be embodied or implemented in any similar communication system, whether presently defined or defined in the future.

Figure 24:
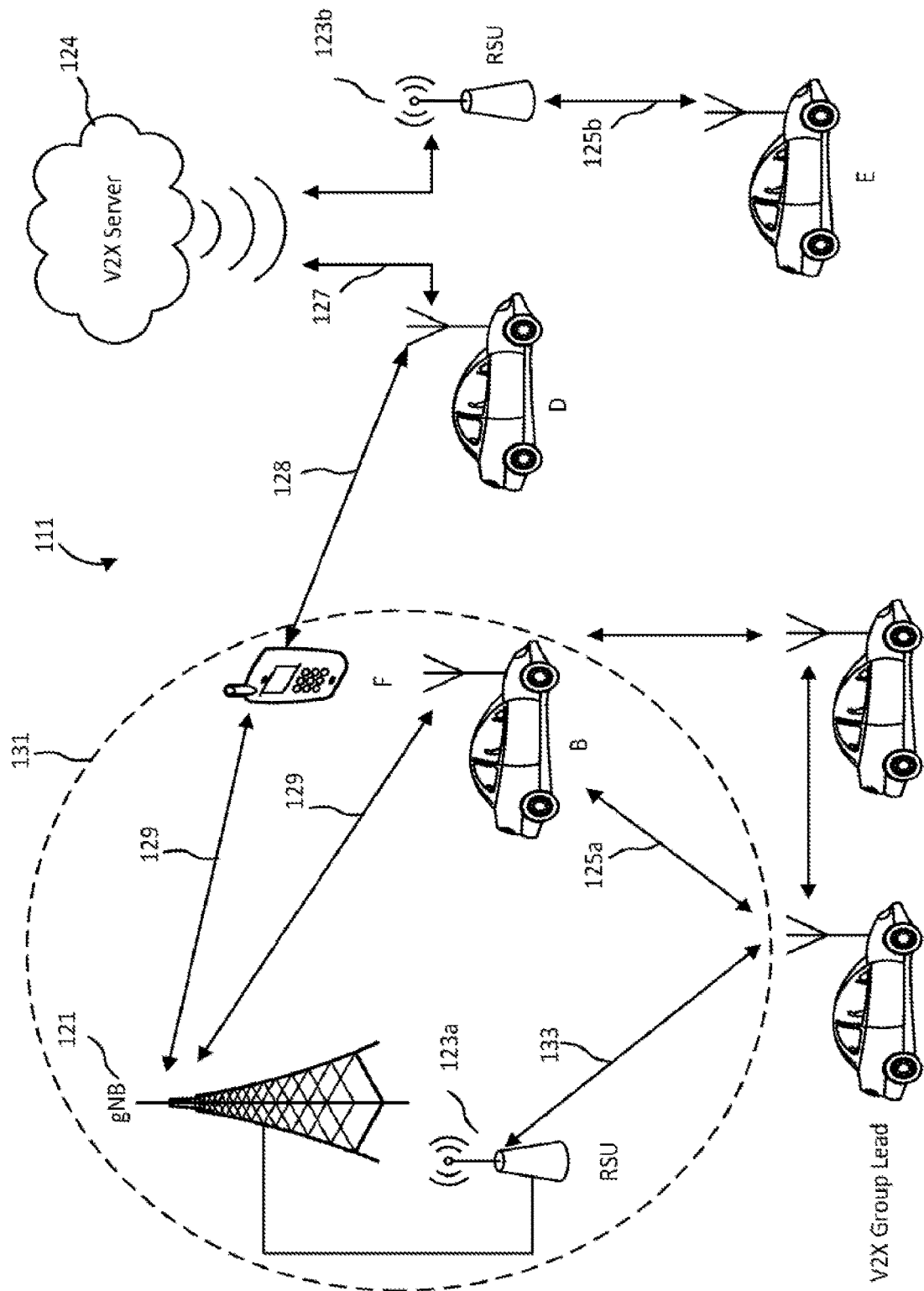
FIG. 24 illustrates another example communications system.

FIG. 24 illustrates an example communications system 111 in which the systems, methods, apparatuses described herein may be used. Communications system 111 may include Wireless Transmit/Receive Units (WTRUs) A, B, C, D, E, F, a base station gNB 121, a V2X server 124, and Road Side Units (RSUs) 123a and 123b. In practice, the concepts presented herein may be applied to any number of WTRUs, base station gNBs, V2X networks, and/or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUs A, B, C, D, E, and F may communicate with each other over a Uu interface 129 via the gNB 121 if they are within the access network coverage 131. In the example of FIG. 24, WTRUs B and F are shown within access network coverage 131. WTRUs A, B, C, D, E, and F may communicate with each other directly via a Sidelink interface (e.g., PC5 or NR PC5) such as interface 125a, 125b, or 128, whether they are under the access network coverage 131 or out of the access network coverage 131. For instance, in the example of FIG. 24, WRTU D, which is outside of the access network coverage 131, communicates with WTRU F, which is inside the coverage 131.

WTRUs A, B, C, D, E, and F may communicate with RSU 123a or 123b via a Vehicle-to-Network (V2N) 133 or Sidelink interface 125b. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 25:
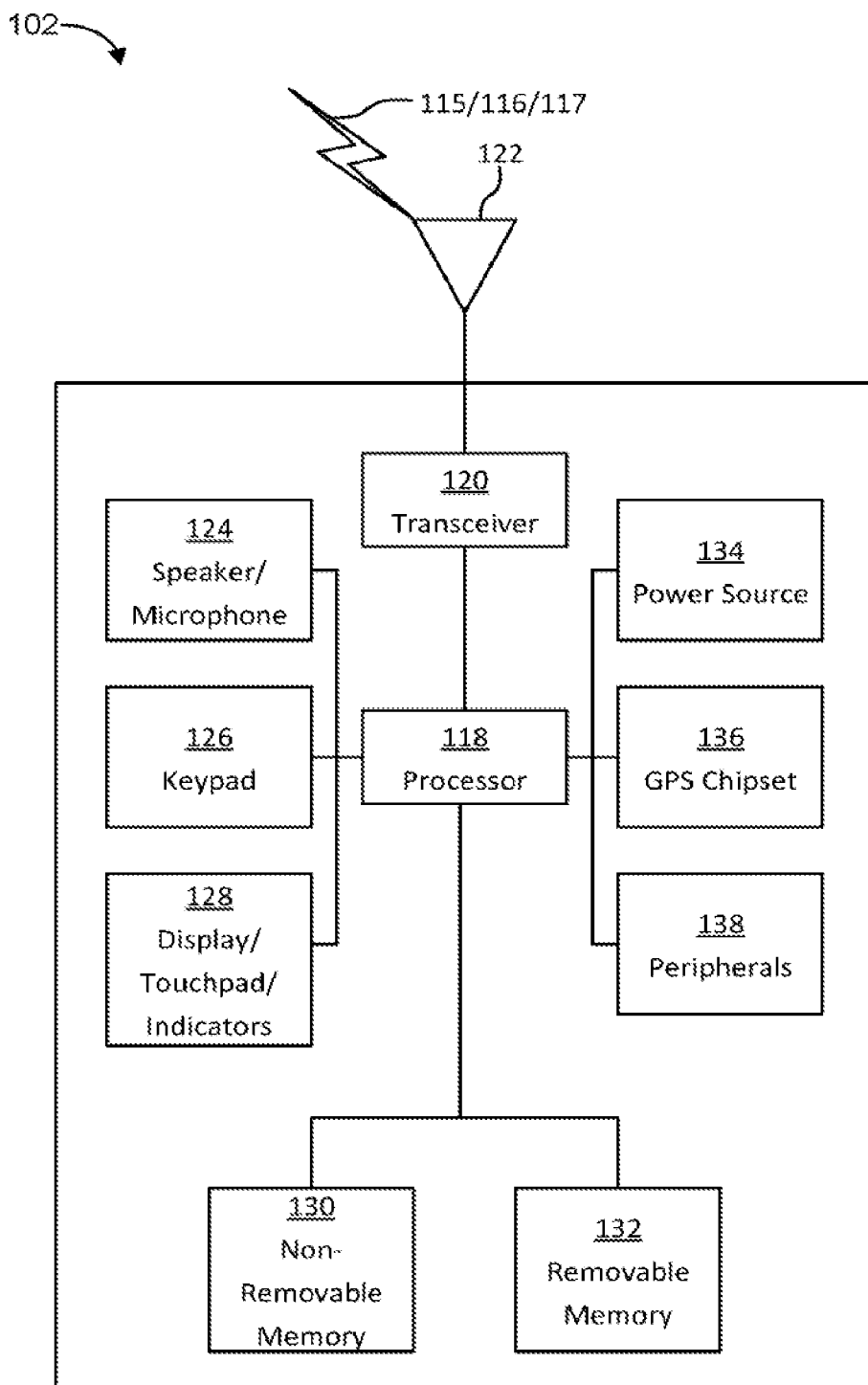
FIG. 25 is a block diagram of an example apparatus or device, such as a WTRU.

FIG. 25 is a block diagram of an example apparatus or device WTRU 102 that may be configured for wireless communications and operations in accordance with the systems, methods, and apparatuses described herein, such as a WTRU 102 of FIG. 20, 21, 22, 23, or 24. As shown in FIG. 25, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 25 and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 25 depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 20) over the air interface 115/116/117 or another UE over the air interface 115d/116d/117d. For example, the transmit/receive element 122 may be an antenna configured to transmit and/or receive RF signals. The transmit/receive element 122 may be an emitter/detector configured to transmit and/or receive IR, UV, or visible light signals, for example. The transmit/receive element 122 may be configured to transmit and receive both RF and light signals. It will be appreciated that the transmit/receive element 122 may be configured to transmit and/or receive any combination of wireless or wired signals.

In addition, although the transmit/receive element 122 is depicted in FIG. 25 as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit. The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 26:
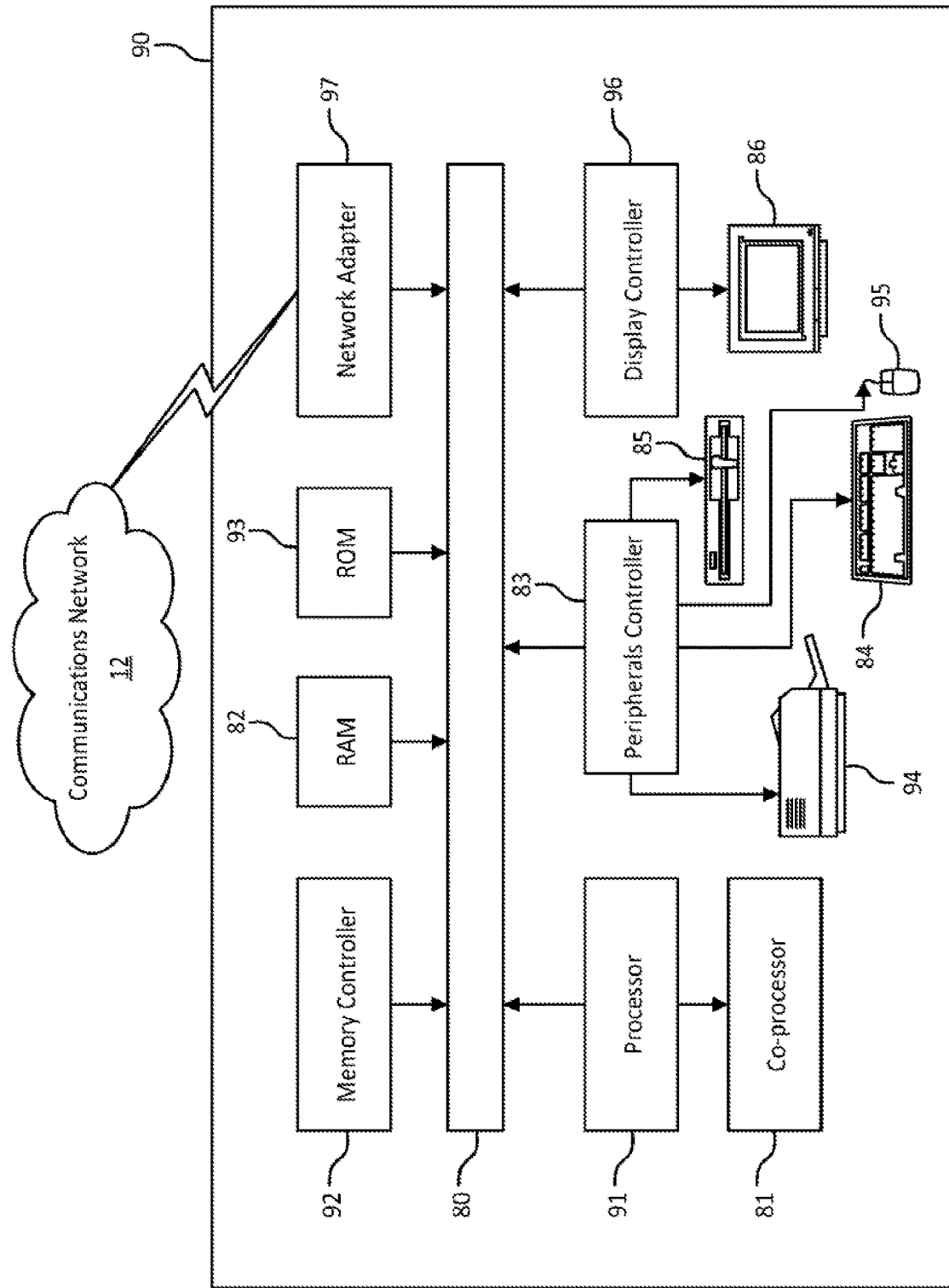
FIG. 26 is a block diagram of an exemplary computing system.

FIG. 26 is a block diagram of an exemplary computing system 90 in which one or more apparatuses of the communications networks illustrated in FIGS. 20, 22, 23 and 24 may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIGS. 20, 21, 22, 23, and 24, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations, or functions described herein may be implemented in the form of such computer executable instructions, executing on the processor of an apparatus or computing system configured for wireless and/or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

We claim:

1. An apparatus comprising a processor, a memory, and communication circuitry, the apparatus configured to communicate via the communication circuitry, the apparatus further comprising computer-executable instructions stored in the memory of the apparatus which, when executed by the processor of the apparatus, cause the apparatus to:
   receive, from a first network, system information, the system information relating to network support for restricted access for network selection assistance;
   send, to the first network, a registration request, the registration request signaling a limited registration;
   receive, via the first network, network information from a server;
   de-register from the first network; and
   register with a second network.

2. The apparatus of claim 1, wherein the registration request further signals support for non-coverage related network transfers.

3. The apparatus of claim 1, wherein the computer-executable instructions further cause the apparatus to send a network selection request that comprises a list of found networks.

4. The apparatus of claim 3, wherein the second network is selected from the list of found networks.

5. The apparatus of claim 3, wherein the network selection request further comprises a received signal strength associated with each found network.

6. The apparatus of claim 3, wherein the network selection request further comprises a cell identity of a strongest cell associated with each found network.

7. The apparatus of claim 3, wherein the network selection request is sent in a non-access-stratum message.

8. The apparatus of claim 3, wherein the network selection request is sent to a policy control function.

9. The apparatus of claim 3, wherein the network selection request is sent to the server via a restricted local operator services, RLOS, connection using Internet protocol, IP, based communication.

10. The apparatus of claim 3, wherein the registration request includes information indicating the network selection request.

11. The apparatus of claim 10, wherein the network information comprises information indicating a network selection response.

12. The apparatus of claim 11, wherein the network selection response comprises an indication of a time window to execute a registration to the second network.

13. A method performed by an apparatus comprising a processor and a memory, the method comprising:
   receiving, from a first network, system information, the system information relating to network support for restricted access for network selection assistance;
   sending, to the first network, a registration request, the registration request signaling a limited registration;
   receive, via the first network, network information from a server;
   de-registering from the first network; and
   registering with a second network.

14. The method of claim 13, wherein the network information comprises an indication of a time window to execute a registration to the second network.

15. The method of claim 13, wherein the registration request further signals support for non-coverage related network transfers.

16. The method of claim 13, further comprising sending a network selection request that comprises a list of found networks.

17. The method of claim 16, wherein the second network is selected from the list of found networks.

18. The method of claim 16, wherein the network selection request further comprises a received signal strength associated with each found network.

19. The method of claim 16, wherein the network selection request is sent in a non-access-stratum message.

20. A non-transitory computer-readable storage medium having stored thereon computer-executable instructions, which, upon execution by one or more processors, caused the one or more processors to perform operations comprising:
- receiving, from a first network, system information, the system information relating to network support for restricted access for network selection assistance;
- sending, to the first network, a registration request, the registration request signaling a limited registration;
- receive, via the first network, network information from a server;
- de-registering from the first network; and
- registering with a second network.

\* \* \* \* \*